United States Patent
Xiao et al.

(10) Patent No.: US 11,550,601 B2
(45) Date of Patent: Jan. 10, 2023

(54) FRAMEWORK PROVIDING APPLICATION PROGRAMMING INTERFACE FOR USER INTERFACES AND ANIMATION

(71) Applicant: Apple Inc., Cupertino, CA (US)

(72) Inventors: Jacob A. Xiao, Los Gatos, CA (US); Kyle S. Macomber, Los Altos, CA (US); Joshua H. Shaffer, Woodside, CA (US); John S. Harper, London (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/428,852

(22) Filed: May 31, 2019

(65) Prior Publication Data
US 2019/0370030 A1    Dec. 5, 2019

Related U.S. Application Data

(60) Provisional application No. 62/679,890, filed on Jun. 3, 2018.

(51) Int. Cl.
*G06F 9/451* (2018.01)
*G06F 16/901* (2019.01)
(Continued)

(52) U.S. Cl.
CPC .......... *G06F 9/451* (2018.02); *G06F 3/04812* (2013.01); *G06F 3/04883* (2013.01);
(Continued)

(58) Field of Classification Search
CPC ... G06F 3/048; G06F 9/44; G06F 9/54; G06F 9/451; G06F 16/9027; G06F 16/9024;
(Continued)

(56) References Cited

U.S. PATENT DOCUMENTS 6,496,842 B1    12/2002   Lyness
6,504,545 B1    1/2003    Browne
(Continued)

FOREIGN PATENT DOCUMENTS

EP      2584450        4/2013
WO    WO 2016/033128   3/2016

OTHER PUBLICATIONS

Technical Café: "Create an Animated Progress Bar using HTML, CSS and JavaScript," May 28, 2018, 1 page, retrieved from internet: https://www.youtube.com/watch?v=7x_nkGdEc7g.
(Continued)

*Primary Examiner* — Jennifer N Welch
*Assistant Examiner* — Reji Kartholy
(74) *Attorney, Agent, or Firm* — BakerHostetler

(57) ABSTRACT

The subject technology receives a command to initiate an application. The subject technology, in response to the command, generates a root node related to a root view of a first hierarchy of views representing a user interface (UI). The subject technology generates a child node of the root node for including in the first hierarchy of views, the child node corresponding to a first type of view. The subject technology generates a first child node of the child node for including in the first hierarchy of views, the first child node corresponding to a second type of view. The subject technology generates a graph including nodes, each node corresponding to a different attribute of the UI, wherein the root node, the child node, and the first child node have relationships with respective nodes from the graph.

20 Claims, 28 Drawing Sheets

(51) Int. Cl.
*G06F 3/04883* (2022.01)
*G06T 13/80* (2011.01)
*G06F 3/04812* (2022.01)
*G06F 8/38* (2018.01)
*G06F 9/54* (2006.01)

(52) U.S. Cl.
CPC .............. *G06F 8/38* (2013.01); *G06F 9/547* (2013.01); *G06F 16/9024* (2019.01); *G06F 16/9027* (2019.01); *G06T 13/80* (2013.01)

(58) Field of Classification Search
CPC .... G06F 3/04812; G06F 3/04883; G06F 8/38; G06F 9/547; G06T 13/80
See application file for complete search history.

(56) References Cited

U.S. PATENT DOCUMENTS

| | | | |
|---|---|---|---|
| 7,530,028 B2 | 5/2009 | Mulcahy | |
| 7,865,834 B1 | 1/2011 | vanOs | |
| 9,690,764 B1* | 6/2017 | Batni | G06F 40/103 |
| 2003/0226111 A1* | 12/2003 | Wirts | G06F 8/38 |
| | | | 715/209 |
| 2004/0122789 A1 | 6/2004 | Ostertag | |
| 2004/0189669 A1 | 9/2004 | David et al. | |
| 2006/0129933 A1* | 6/2006 | Land | G09G 5/00 |
| | | | 715/723 |
| 2007/0016604 A1 | 1/2007 | Murthy | |
| 2012/0290925 A1* | 11/2012 | Atkins | H04N 21/4312 |
| | | | 715/243 |
| 2013/0159914 A1 | 6/2013 | Grigoryev et al. | |
| 2013/0185240 A1* | 7/2013 | Ward | G06F 3/0486 |
| | | | 706/47 |
| 2014/0188942 A1* | 7/2014 | Branton | G06F 9/451 |
| | | | 707/801 |
| 2014/0245196 A1* | 8/2014 | Zheng | G06F 8/38 |
| | | | 715/762 |
| 2016/0034441 A1* | 2/2016 | Nguyen | G06F 40/137 |
| | | | 715/234 |
| 2016/0070434 A1* | 3/2016 | Clark | G06F 9/452 |
| | | | 715/762 |
| 2016/0104311 A1 | 4/2016 | Allyn | |
| 2016/0259651 A1* | 9/2016 | Nychis | G06F 3/048 |
| 2021/0256088 A1* | 8/2021 | Shi | G06F 16/958 |

OTHER PUBLICATIONS

Invitation to Pay Additional Fees and Partial Search Result from PCT/US2019/034982, dated Aug. 29, 2019, 14 pages.
International Search Report and Written Opinion from PCT/US2019/034982, dated Oct. 21, 2019, 18 pages.
"Add a custom palette to IB that propagates if a color changes iOS," retrieved from https://stackoverflow.com/questions/31702193/add-a-custom-palette-to-ib-that-propagates-if-a-color-changes-ios, Jul. 2015, 4 pages.
"ColorableNavigationController.swift," retrieved from https://gist.github.com/Sorix/1d8543b18cfd76c12c36525bc280a35d, Apr. 2017, 5 pages.
"Get and set preference values," retrieved from https://stackoverflow.com/questions/43922207/get-and-set-preference-values, May 2017, 8 pages.
"How do I animate child view controllers when adding to/removing from a container view controller?," retrieved from https://stackoverflow.com/questions/44753084/how-do-i-animate-child-view-controllers-when-adding-to-removing-from-a-container, Jun. 2017, 3 pages.
"How do I get the Category of an Android Preference," retrieved from https://stackoverflow.com/questions/6177244/how-do-i-get-tiie-category-of-an-android-preference, May 2011, 4 pages.
"How long is the animation of the transition between views on a UINavigationContoller?" retrieved from https://stackoverflow.com/questions/7609072/how-long-is-the-animation-of-the-transition-between-views-on-a-uinavigationcontr, Feb. 2015, 2 pages.
"How to change text color of preference category in Android?," retrieved from https://stackoverflow.com/questions/11607302/how-to-change-text-color-of-preference-category-in-android, Jul. 2012, 8 pages.
"How To Send Variable From Parent Class to Child Custom Class," retrieved from https://stackoverflow.com/questions/41754547/how-to-send-variable-from-parent-class-to-child-custom-class, Jan. 2017, 2 pages.
"How to set animation curve when using keyframe animation in the ios?," retrieved from https://stackoverflow.com/questions/20638956/how-to-set-animation-curve-when-using-keyframe-animation-in-ios, Dec. 2013, 4 pages.
"Passing data back from child view controller," retrieved from https://stackoverflow.com/questions/34969152/passing-data-back-from-child-view-controller, Jan. 2016, 4 pages.
"pushviewController/popviewController animation duration," retrieved from https://stackoverflow.com/questions/7108771/pushviewcontroller-popviewcontroller-animation-duration. Aug. 2011, 2 pages.
"Swift: How to store user preferences? [closed]," retrieved from https://stackoverflow.com/questions/30041765/swift-how-to-store-user-preferences, May 2015, 3 pages.
"UIView as dictionary key?," retrieved from https://stackoverflow.com/questions/2992315/uiview-as-dictionary-key, Jun. 2010, 5 pages.
Neuburg, *Programming iOS*, Chapter 19. View Controllers, 2013, 82 pages.
Visual Binary Trees with Swift 3, Part II, Sep. 2016, 15 pages.
European Office Action from European Patent Application No. 19736540.6, dated Feb. 24, 2022, 11 pages.
"Change alpha of child view and not the parent view in swift," retrieved from https://stackoverflow.com/questions/46675095/change-alpha-of-child-view-and-not-the-parent-view-in-swift, Oct. 2017, 2 pages.
"Change color of external ViewController," retrieved from https://stackeroverflow.com/questions/48893488/change-color-of-external-viewcontroller, Feb. 2018, 2 pages.
"How to set text color for all subviews?," retrieved from https://stackoverflow.com/questions/31310905/how-to-set-text-color-for-all-subviews, Jul. 2015, 3 pages.
"Views and the View Hierarchy in iOS Programming," retrieved from https://www.informit.com/articles/printerfriendly/2474236, Feb. 2016, 20 pages.
Zhou, "A Practise of Method Swizzling in iOS Development," retrieved from https://wiredcraft.com/blog/method-swizzling-ios/, Nov. 2015, 8 pages.

* cited by examiner

1810 — Example code for creating nodes of a view tree struct MyView: CustomView { func rootView (state, env)→ Child protocol View {
    func makeNode()→ Node
} protocol CustomView {
    func rootView (state, env)→ Child
} extension CustomView
    func makeNode ()→ Node {
        return CustomView Node (...)
    }
}

1840 — For starting an application with a node tree implementation:
App.run(myView()) ------------> which then calls makeNode()

1880 — For starting an application with an attribute graph implementation:
App.run(myView()) ------------> which then calls instantiate(SetOfAttributes)

*FIG. 18*

2110 → declarative code example (e.g., chevron example within 10x10 box):

```
struct MyView {
    struct State {
        var isToggled:Bool
    }
    func rootView {
        chevron.alignment (x: .leading, y: .top).size(10,10)
            (x: state.isToggled ? leading: trailing)
    }
}
```

2140 → imperative code example:

```
struct AlignmentLayout {
if leading {
    x=0
    if toggled
        x = size.width
    if top
        y = 0
    }
}
```

*FIG. 21*

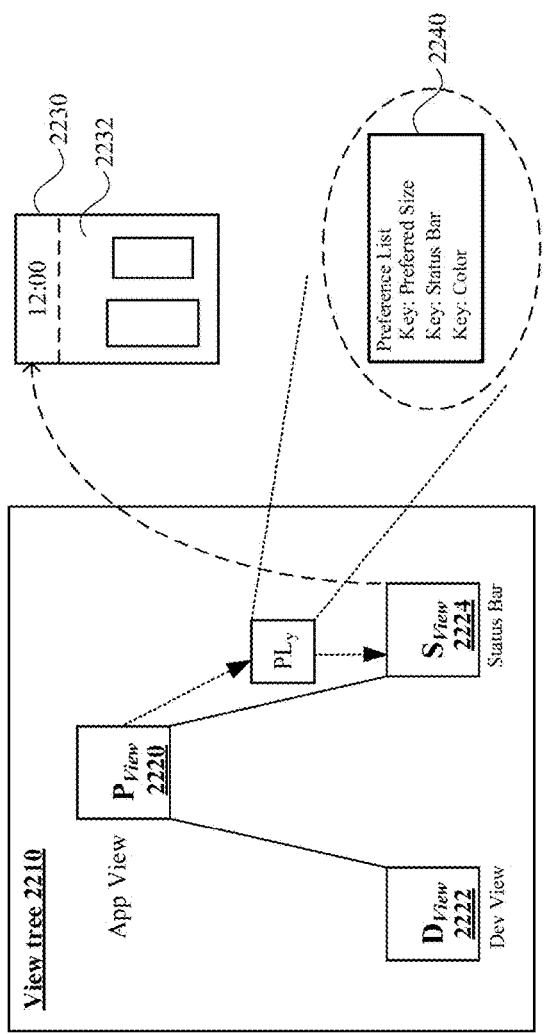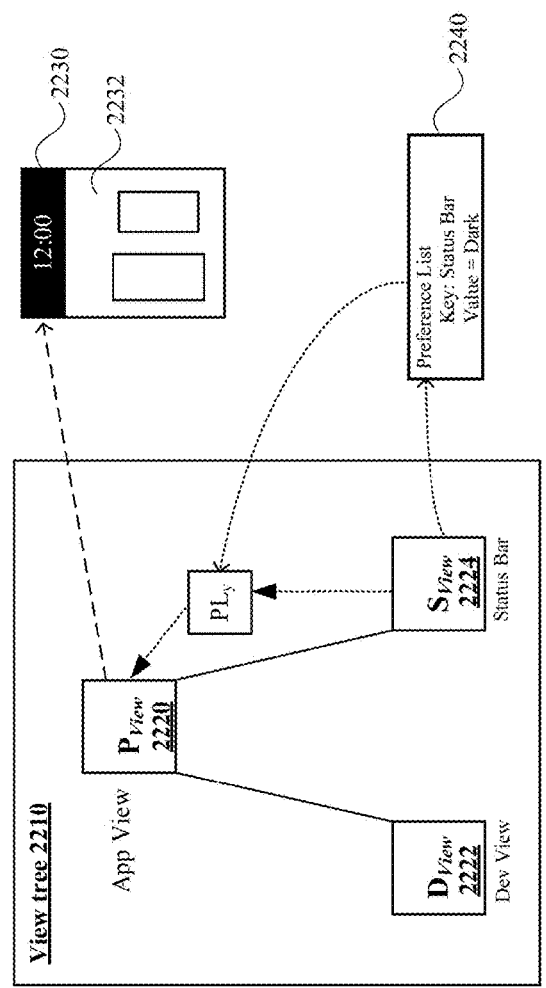
FIG. 22A
FIG. 22B

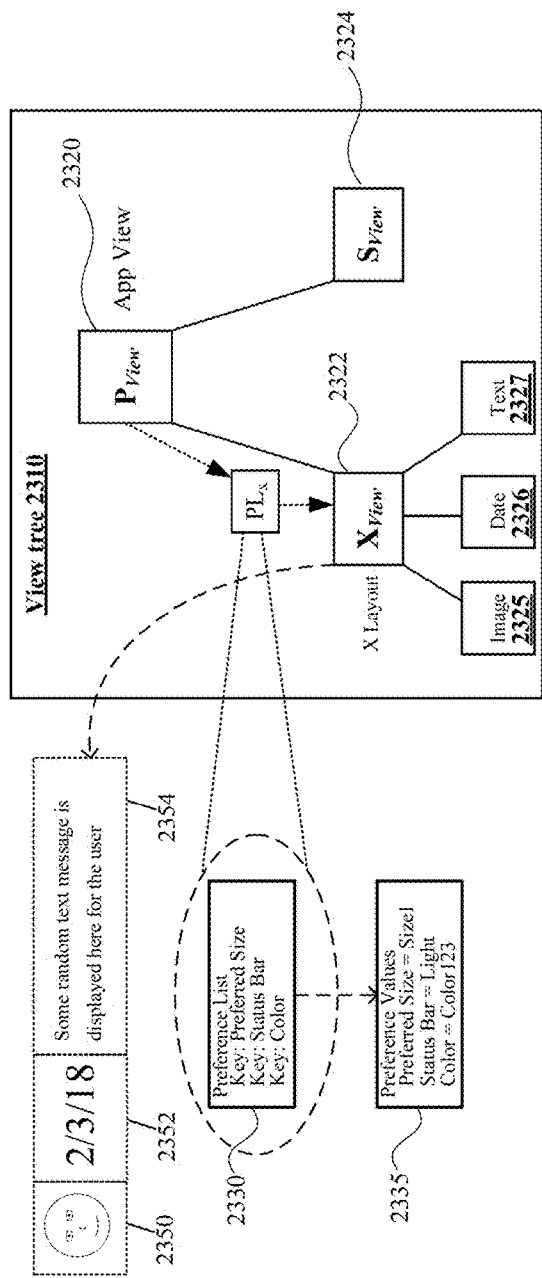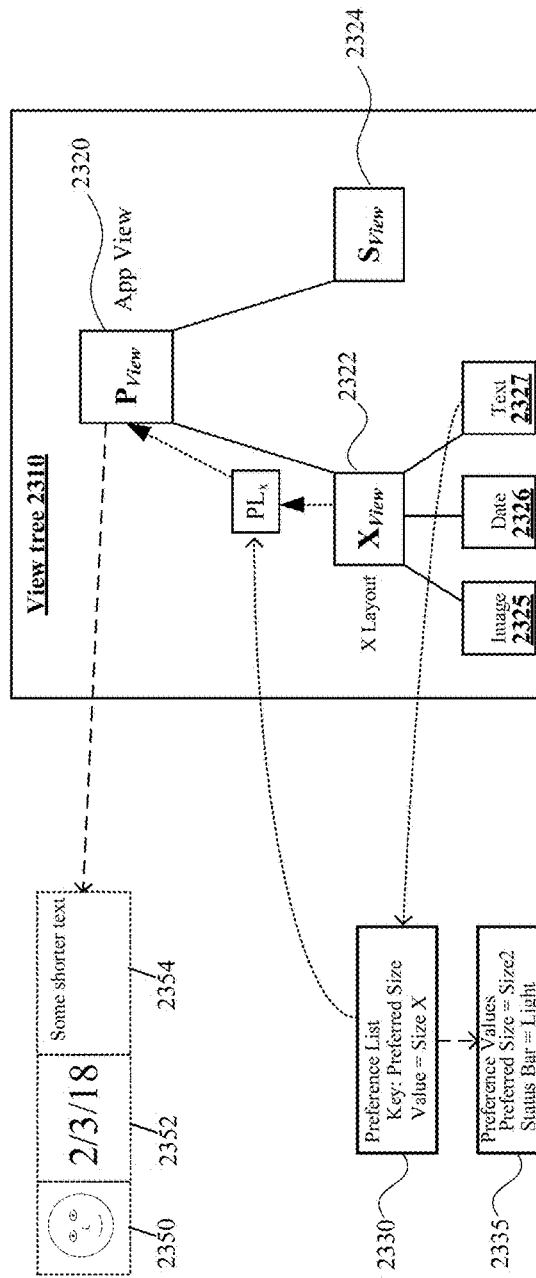
*FIG. 23A*
*FIG. 23B*

2500

```
┌─────────────────────────────────────────────────────────┐
│ INITIALIZE A SET OF ATTRIBUTES RELATED TO A HIERARCHY OF│
│ VIEWS REPRESENTING A USER INTERFACE (UI), THE SET OF    │─2510
│ ATTRIBUTES BEING STORED IN AN ATTRIBUTE GRAPH           │
└─────────────────────────────────────────────────────────┘
                            │
                            ▼
┌─────────────────────────────────────────────────────────┐
│       UPDATE A PARTICULAR ATTRIBUTE FROM THE SET OF     │─2512
│                       ATTRIBUTES                        │
└─────────────────────────────────────────────────────────┘
```

*FIG. 25*

FRAMEWORK PROVIDING APPLICATION PROGRAMMING INTERFACE FOR USER INTERFACES AND ANIMATION

CROSS-REFERENCE TO RELATED APPLICATIONS

The present application claims the benefit of U.S. Provisional Patent Application Ser. No. 62/679,890, entitled "FRAMEWORK PROVIDING APPLICATION PROGRAMMING INTERFACE FOR USER INTERFACES AND ANIMATION," filed Jun. 3, 2018, which is hereby incorporated herein by reference in its entirety and made part of the present U.S. Utility Patent Application for all purposes.

TECHNICAL FIELD

The present description relates generally to implementing user interfaces and animation of graphical elements on electronic devices with and/or without touchscreens.

BACKGROUND

A given operating system may provide graphics and imaging frameworks for developers to create "views" for graphical user interfaces (GUIs or UIs) of a computer application. User Interfaces (UIs) for software applications have increased in complexity and may be implemented to handle views, animations, videos, windows, frames, events, etc., among other types of graphical-related functionality.

BRIEF DESCRIPTION OF THE DRAWINGS

Certain features of the subject technology are set forth in the appended claims. However, for purpose of explanation, several embodiments of the subject technology are set forth in the following figures.

FIG. 18 illustrates different example code segments for various operations involving a node tree and an attribute graph in accordance with one or more implementations.

FIG. 21 illustrates different example code segments for declarative code to define a layout and imperative code to change a state of the layout in accordance with one or more implementations.

FIGS. 22A-22B conceptually illustrate examples of utilizing a preferences list in a view tree to change a state of a particular view for a status bar of a UI in accordance with one or more implementations.

FIGS. 23A-23B conceptually illustrate examples of utilizing a preferences list in a view tree to change a size of a particular view of a UI in accordance with one or more implementations.

FIG. 25 illustrates a flow diagram of an example process of updating an attribute related to a particular view for performing on an electronic device in accordance with one or more implementations.

DETAILED DESCRIPTION

Figure 1:
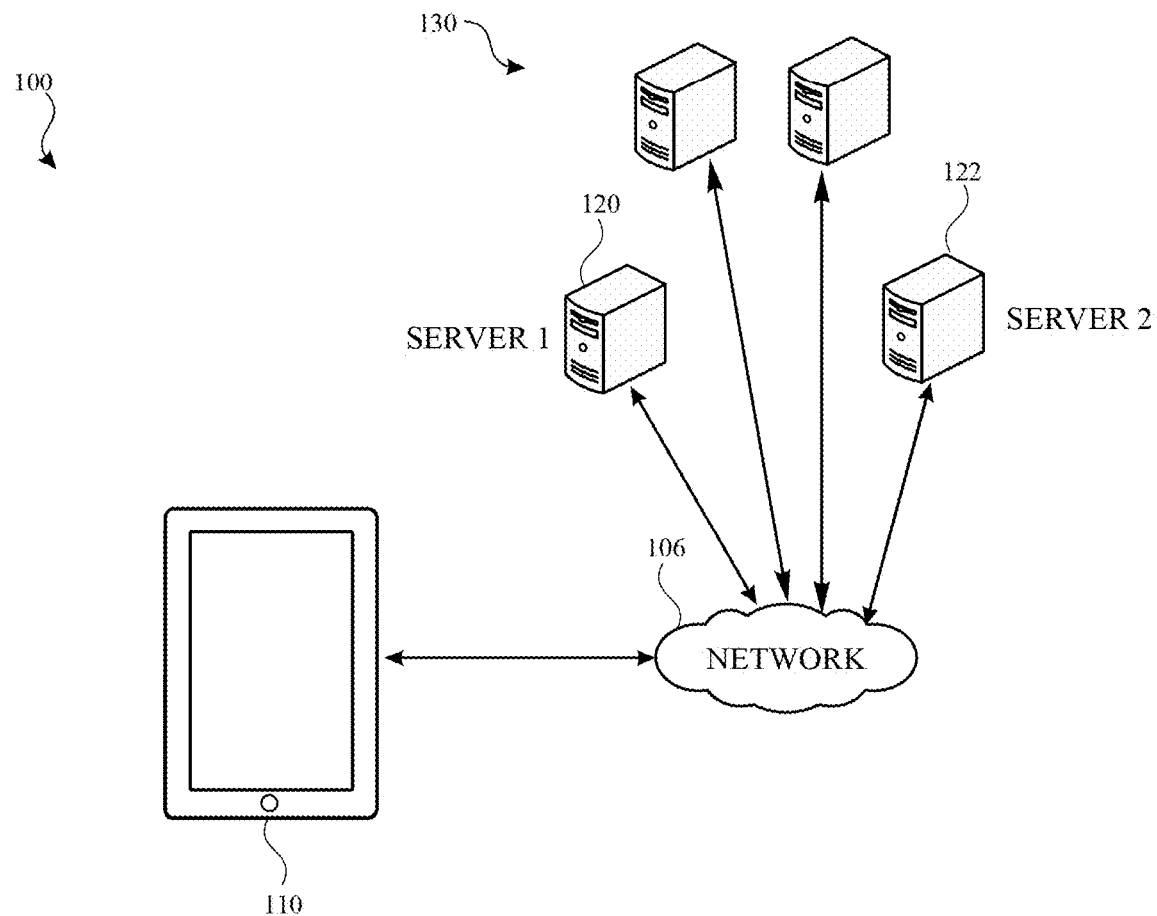
FIG. 1 illustrates an example network environment including an electronic device that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides a framework for handling graphics animation and operations for graphical user interfaces of a software application executing on a given electronic device. A framework can refer to a software environment that provides particular functionality as part of a larger software platform to facilitate development of software applications, and may provide one or more application programming interfaces (APIs) that may be utilized by developers to design, in a programmatic manner, user interfaces and to handle operations for such user interfaces including animations and layout of graphical elements. In an example, this framework provides components to implement a graphical, event-driven user interface that includes UI elements (e.g., windows, dialogs, labels, images, buttons, menus, text fields, pickers, sliders, switches, etc.), handles the rendering of UI elements and animations, and communicates with hardware devices and screen buffers.

For example, the framework as described herein enables developers to create "views" for graphical user interfaces (GUIs) of a computer application. A view can be understood as a visual component of a given application's user interface that can be seen by a user. In some examples, a view may be interacted with, by a user, in some manner. Moreover, the framework supports a user interface with a hierarchy of views such that at least one view can be included within another view, which can be further utilized to define a layout of views within the user interface and/or other properties associated with a set of views within the hierarchy. As discussed further herein, a tree structure may be provided to represent such a hierarchy of views in which parent-child relationships between views are established between respective nodes in the tree structure.

In one or more implementations, the subject system provides a user interface (UI) API that enables developers to create UIs that animate and interact with gesture events in a manner that reduces UI exceptions (e.g., bugs), and significantly reduces an amount of code required to support such animations and/or gesture events. Components of the UI API further provide features that improve UI consistency by implementing an environment system that passes down parameters to views of the UI, and a preference system that applies preferences to the views of the UI in a manner consistent with expected UI behavior. For the purposes of explanation, the UI API is described as a single API herein. However, it is appreciated that the UI API may be implemented as multiple different APIs in which one or more APIs provide a particular set of functionality described further herein.

FIG. 1 illustrates an example network environment 100 including an electronic device 110 that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, a server 120, and a server 122 in which the server 120 and/or the server 122 may be included in a group of servers 130. The network 106 may communicatively (directly or indirectly) couple, for example, the electronic device 110 with the server 120 and/or the server 122 and/or the group of servers 130. In one or more implementations, the network 106 may be an interconnected network of devices that may include, or may be communicatively coupled to, the Internet. For explanatory purposes, the network environment 100 is illustrated in FIG. 1 as including the electronic device 110, the server 120, the server 122, and the group of servers 130; however, the network environment 100 may include any number of electronic devices and any number of servers or a data center including multiple servers.

The electronic device 110 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a virtual reality or augmented reality environment. In one or more implementations, the electronic device 110 may include a touchpad. In FIG. 1, by way of example, the electronic device 110 is depicted as a tablet device with a touchscreen. In one or more implementations, the electronic device 110 may be, and/or may include all or part of, the electronic system discussed below with respect to FIG. 26.

The electronic device 110 may implement the subject system to provide graphical user interfaces and animations. In one or more implementations, the electronic device 110 may include a framework that is able to support graphical user interfaces and animations, which may be provided in a particular software library in one implementation. For example, the electronic device 110 may implement the example software architecture for implementing the framework and UI API that is discussed further below with respect to FIG. 2. Examples of animations and operations performed via touchscreen are discussed further below with respect to FIGS. 3A-3C, FIGS. 4A-4C, FIGS. 5A-5C, FIGS. 9A-9C, FIGS. 10A-10C, FIGS. 11A-11C, FIG. 17, FIGS. 20A-20B, and FIGS. 21A-21B.

The server 120 and/or the server 122 may be part of a network of computers or the group of servers 130, such as in a cloud computing or data center implementation. The server 120, the server 122, and/or the group of servers 130 may store data, such as photos, music, text, web pages and/or content provided therein, etc., that may be accessible on the electronic device 110. In one or more implementations, the electronic device 110 may support a UI operation that involves a representation of a data item that is physically stored on the server 120, the server 122, and/or one or more servers from the group of servers 130, such as an image file, text, a sound file, a video file, an application, etc.

For providing the UI API described herein, a software architecture is described, in the following discussion of FIG. 2, that implements the functionality for supporting UIs and animations in accordance with one or more implementations.

Figure 2:
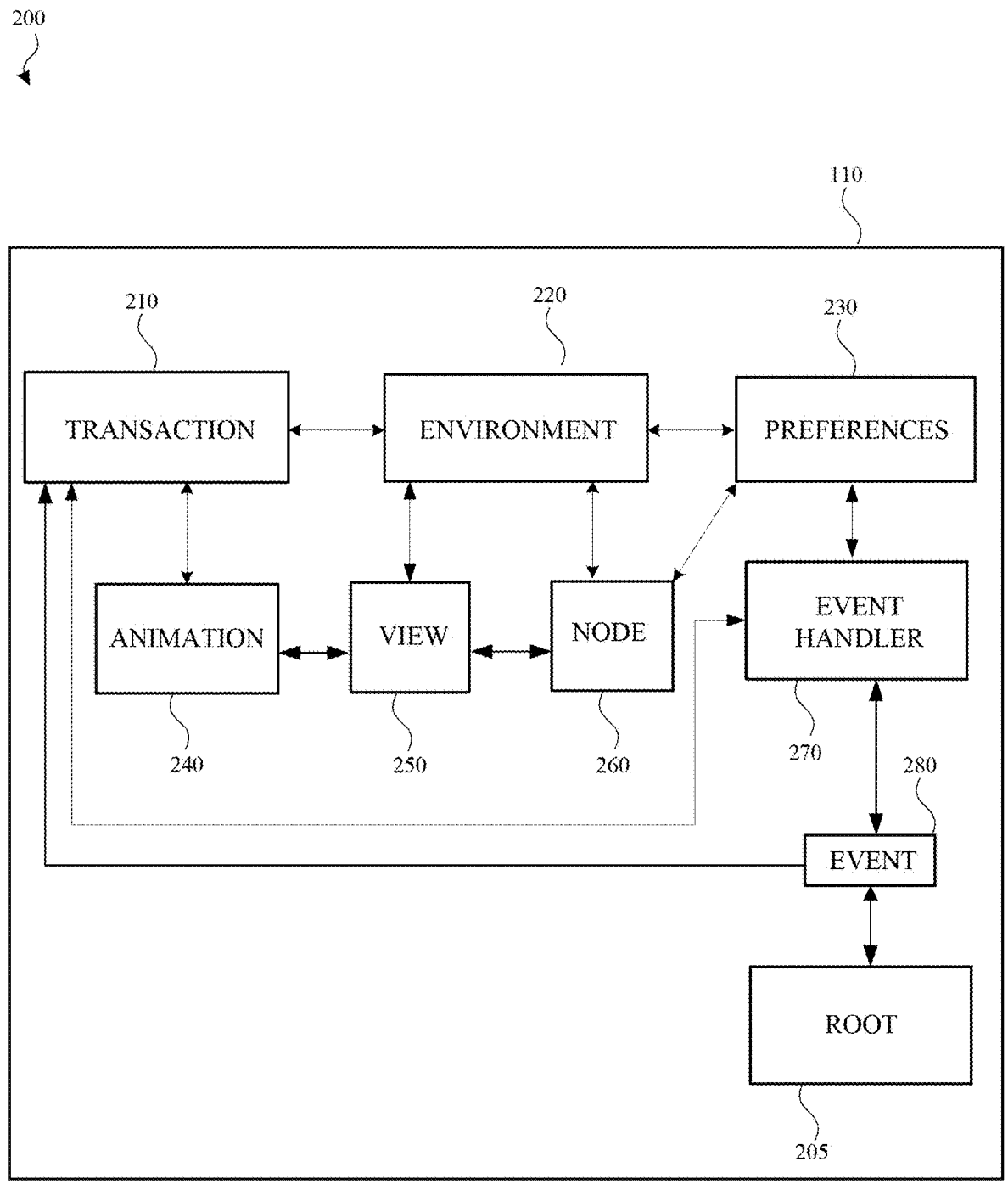
FIG. 2 illustrates an example software architecture that may be implemented on an electronic device in accordance with one or more implementations.

FIG. 2 illustrates an example UI framework 200 that may be implemented on an electronic device in accordance with one or more implementations. For explanatory purposes, the UI framework 200 is described as being implemented by the electronic device 110 of FIG. 1, such as by a processor and/or memory of the electronic device 110; however, the UI framework 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The UI framework 200 includes a root process 205 which is configured to manage an event in connection with a UI. In one or more implementations, the root process 205 may be implemented as an application or daemon running on the electronic device 110. The root process 205 deals with the following three systems included in the UI framework 200: a transaction module 210, a preferences module 230, and an environment module 220.

In an example, the root process 205 receives an event 280 (e.g., gesture or touch input), and then passes the event 280 into the transaction module 210 and passes the event 280 to an event handler 270. The root process 205 may work in conjunction with a gesture handler system (not shown) in order to receive gesture-related events. The transaction module 210 handles and tracks the passing of time and time-based events (e.g., animations), and also tracks a gesture as the gesture is occurring (e.g., more event based and less time based). The transaction module 210 stores transient information about a current change that is happening. In an example, when a view tree is being updated, the transaction module 210 stores information about the current animation. The transaction module 210 passes a value of time (e.g., the current time or an elapsed time) to a particular node included in a tree structure related to views of the UI (as discussed further below), which the particular node may utilize to update its associated view(s).

In one or more implementations, the environment module 220 passes parameters implicitly down the tree. Such parameters, as discussed further herein, can include a size parameter and/or a landscape or portrait mode parameter, for example. The preferences module 230 applies different preferences to a child node based on information being passed upward from the child node to the parent node. In an example, preferences may include a preferred size and a property related to a status bar.

For managing views of the UI, the UI framework 200 provides a view module 250 and a node module 260. As discussed further herein, the view module 250 provides a tree structure including nodes representing hierarchy of views of the UI. Examples of nodes in the tree structure include layout related nodes and animation related nodes.

The software architecture includes a node module 260 that provides persistent data structures corresponding to the views of the view module 250. In one or more implementations, the node module 260 provides a one-to-one corresponding tree structure with nodes that mirror the tree structure provided by the view module 250. Alternatively, as discussed further herein, the node module provides an attribute graph with 1 to n number of nodes providing 1 to n relationships between nodes of the tree structure of views and nodes of the attribute graph.

For supporting animations, the UI framework 200 includes an animation module 240 that provides information related to an animation which is used during the performance of the animation. The animation module 240 communicates with the view module 250 and the transaction module 210 to provide animation-related information in order to update one or more views of the tree structure provided by the view module 250, and also to receive information related to the passage of time from the transaction module 210. An animation, in an example, may be animated based on a timing curve which defines a function that controls the progression of the animation over time. Animations may use different timing functions as provided in the UI framework 200. In an example, the timing functions in the UI framework 200 can generally be represented by segments of functions describing timing curves. The timing functions can be used to define the pacing of an animation over its duration. Examples of such timing functions are discussed in more detail in FIG. 6 below. In addition, an interpolation curve may be utilized to provide an animation that is interpolated (e.g., blended together) from an initial state to a destination state.

Implementations of the subject technology facilitate creation of UIs in a simplified manner by enabling developers to use general-purpose, flexible constructs (e.g., Swift structures or "structs") to programmatically define an animation. Using Swift structs, animations may be expressed in code at a high level (e.g., declaratively) indicating an initial state and a destination state. The initial state and destination state may include long lived information about a particular view associated with the animation. Further, animations may be linked with gestures to support gesture-drive animations that are either time-based or independent of time (e.g., depending on the state of the gesture only).

Figure 3A:
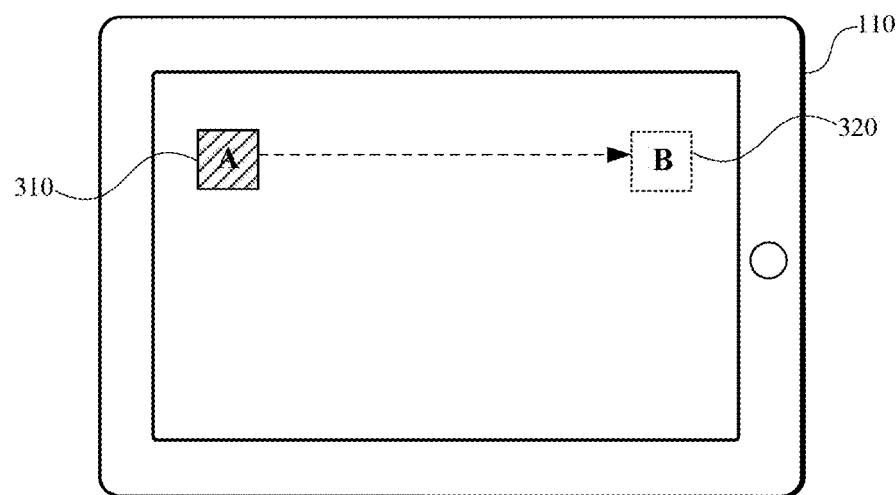
FIGS. 3A-3C illustrate an example animation for moving a horizontal location of a graphical UI element on a screen of the electronic device in accordance with one or more implementations.
Figure 3B:
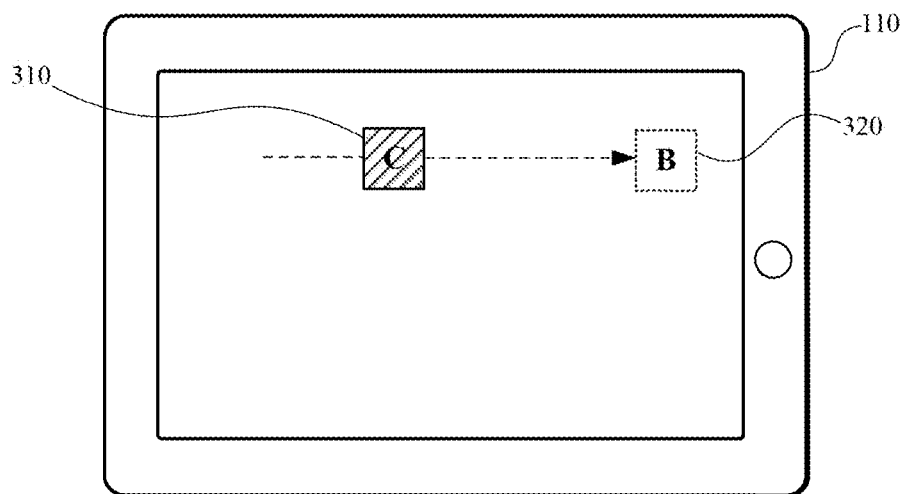
Figure 3C:
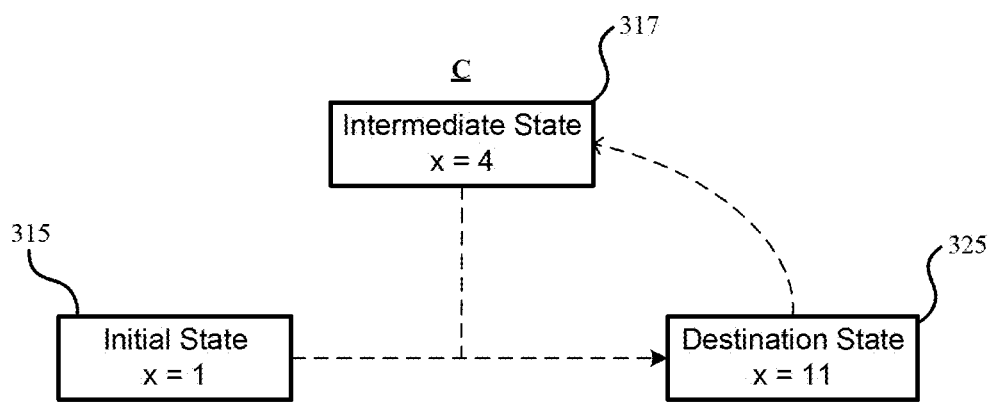

FIGS. 3A-3C illustrate an example animation for moving a horizontal location of a graphical UI element on a screen of the electronic device 110. In FIG. 3A, the graphical UI element is a graphical element 310 (e.g., an image or another type of graphical object) at an initial position which eventually moves to a destination position 320 during the course of the animation. As illustrated in FIG. 3C, the animation module 240, in at least one implementation, may provide information related to an initial state 315 and a destination state 325 of the animation. The initial state 315 includes information of the initial position of the graphical element 310, and the destination state 325 includes information of the destination position 320.

In FIG. 3B, the animation module 240 has updated the animation on the screen which now shows the graphical element 310 moving to an intermediate position as the animation progresses over time. In one or more implementations, the animation module 240 generates synthetic data for sending to the screen as the animation is occurring. The synthetic data may be utilized to represent an intermediate state 317 in FIG. 3C between the initial state 315 and the destination state 325. In an example, the animation module may store information related to the intermediate state 317 as an animation record. An example of an animation record is discussed in more detail in FIG. 7 below.

In the example of FIG. 3B, the animation module 240 makes a copy of the destination state 325 to represent the intermediate state 317 and injects values into the intermediate state 317 to represent a state between the initial state 315 and the destination state 325. As discussed above, the node module 260 provides a tree structure corresponding to a hierarchy of views, in which the tree structure includes nodes for the views. In an example, a particular injected value can be utilized to update a particular node of a view tree for the intermediate state 317 (which was before a copy of the destination state 325). For example, the initial state 315 has a value of x=1, and the destination state 325 has a value of x=11. In FIG. 3B, the intermediate state 317 has a value of 4, which is injected in the intermediate state 317 to update a node in its view tree. The animation module 240 can then instruct the view tree of the intermediate state 317 to update itself in order to show the graphical element 310 at a different position based at least on the updated value of the node.

In one or more implementations, the animation module 240 creates an animation record, which stores properties for animation, e.g., 1) a from value (e.g., 0), 2) a to value (e.g., 11), 3) an animation function such as an associated animation (e.g., represented as a particular timing curve such a linear animation, an ease-in ease-out animation drive by an input gesture, or generally any animation function); and 4) a start time (e.g., for calculating the delta or time offset) for calculating an elapsed time for the animation. It is appreciated that the animation record may have additional properties, and in some implementations, have fewer than the aforementioned properties.

Figure 4A:
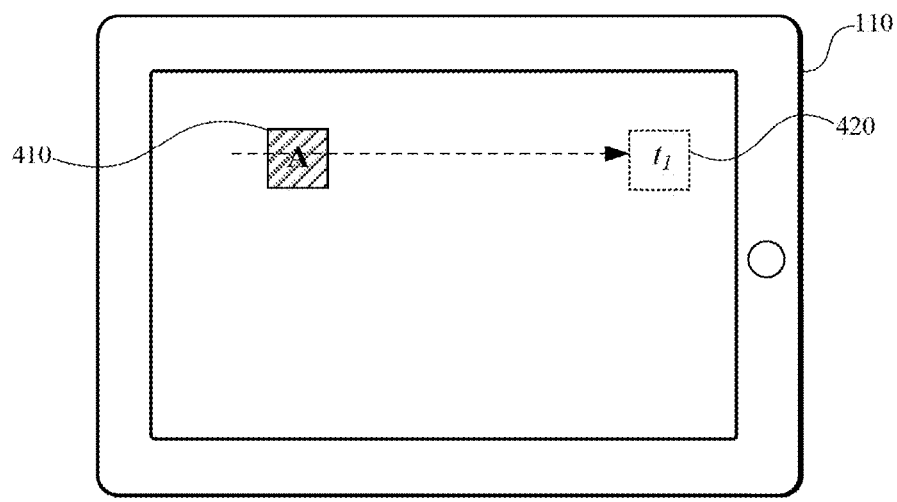
FIGS. 4A-4C illustrate an example for interpolating an animation of a graphical UI element on a screen of the electronic device in accordance with one or more implementations.
Figure 4B:
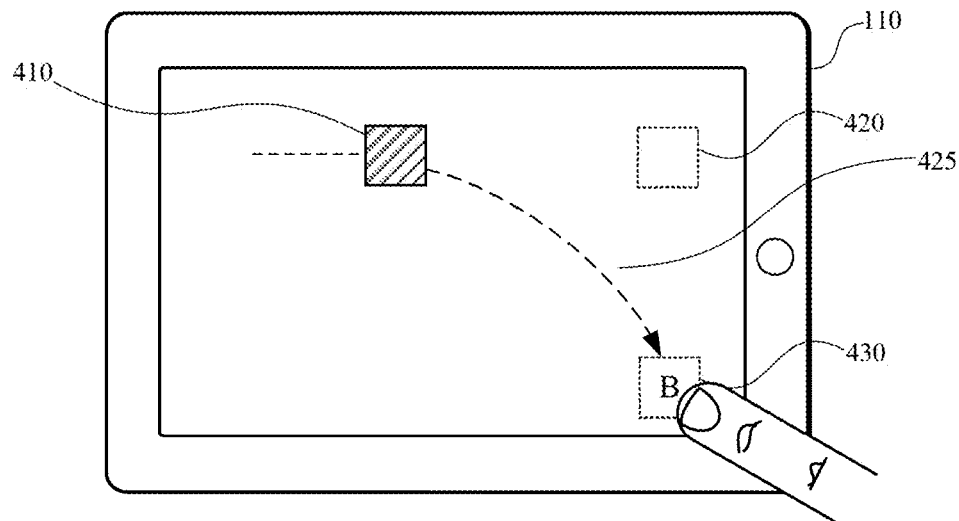
Figure 4C:
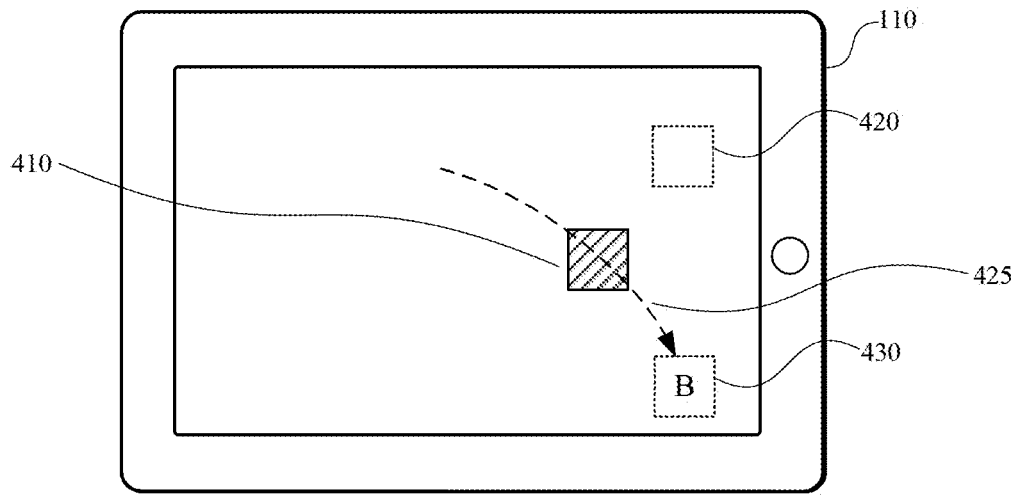

FIGS. 4A-4C illustrate an example for interpolating an animation of a graphical UI element on a screen of the electronic device 110. This example involves receiving multiple touch inputs on a touchscreen of the electronic device 110. Each touch input initiates a particular animation that moves the graphical element 410 at a current position to a particular destination position corresponding to the position of the touch input as received on the touchscreen. In FIG. 4A, the graphical UI element is a graphical element 410 (e.g., an image or another type of graphical object) at an initial position. A touch input is received at a time t1 and initiates a first animation that moves the horizontal position of the graphical element 410 toward a destination position 420 corresponding to the position of the touch input on the touchscreen.

In an example, the touch input is detected as an event by the root process 205, which forwards the event to the event handler 270 and the transaction module 210. The transaction module 210 then forwards information related to the event to the animation module 240. The animation module 240 uses the information related to the event and initiates the first animation to change the position of the graphical element 410 on the screen.

In FIG. 4B, a second touch input is received at a subsequent time t2 from time t1. The graphical element 410 is at a different horizontal position moving toward the destination position 420 when the second touch input is received. A second animation is initiated that intends to move the position of the graphical element 410 toward a second destination position 430 corresponding to the position of the second touch input on the touchscreen.

To provide a smoother transition and avoid a visually jarring change of the movement of the graphical element along its current path, the animation module 240, using combining logic, can perform interpolation of the first animation of the first touch input and the second animation related to the recently received second touch input. Based on this interpolation between the two respective animations, the position of the graphical element 410 is now updated to move along a curved path 425 toward a second destination position 430 corresponding to the second touch input. In FIG. 4C, the position of the graphical element 410 has been moved along the curved path 425 closer to the second destination position 430.

Figure 5A:
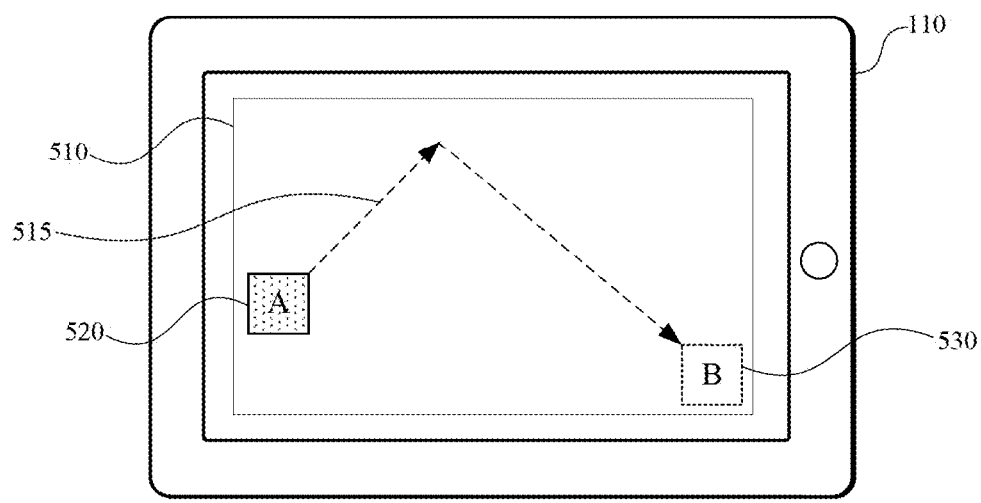
FIGS. 5A-5C illustrate an example of nested animations on a screen of the electronic device in accordance with one or more implementations.
Figure 5B:
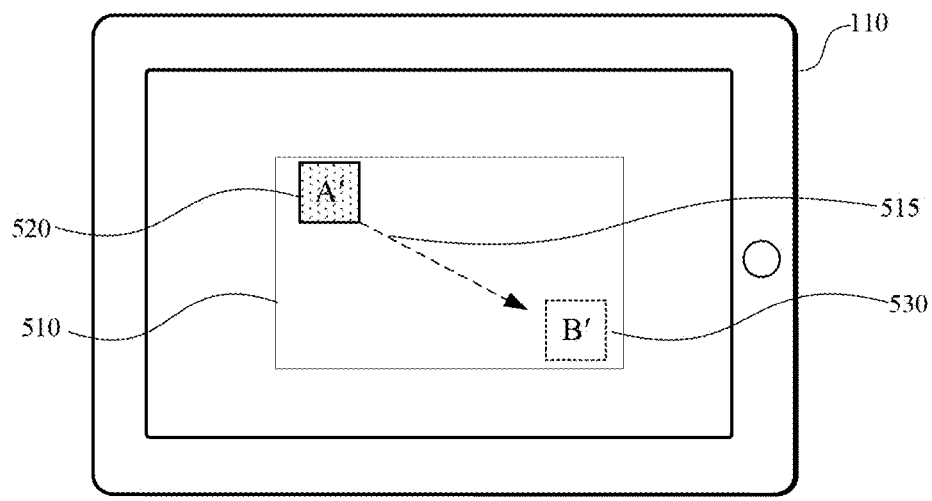
Figure 5C:
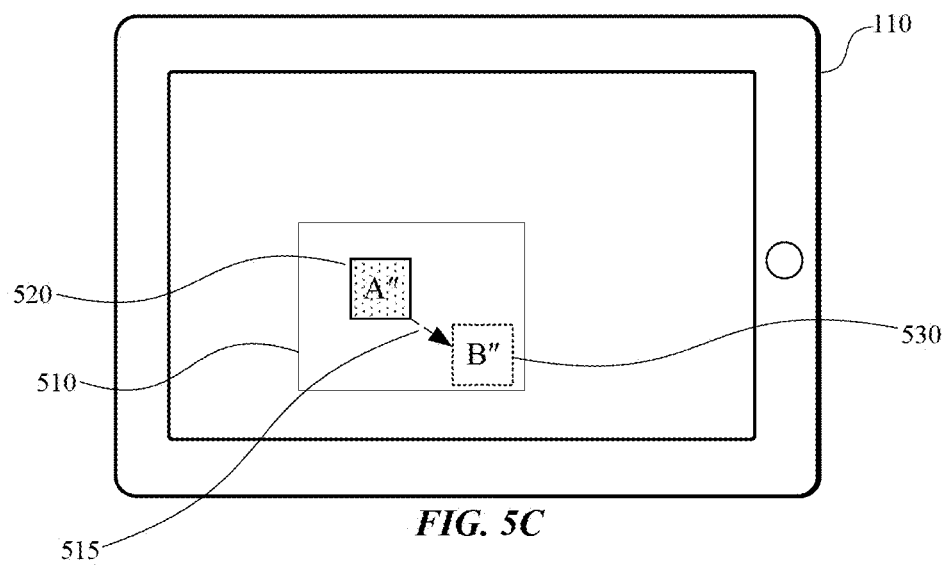

FIGS. 5A-5C illustrate an example of nested animations on a screen of the electronic device 110. In some instances, the UI framework 200 supports having an animation of a parent view which impacts an animation associated with a child view (or vice versa).

In FIG. 5A, a parent view includes a first graphical element 510 (e.g., a window or graphical area) and a child view includes a second graphical element 520 that is at an initial position of bottom left aligned of first graphical element 510 of the parent view. In one or more implementations, an animation of the second graphical element 520 related to the child view may be defined in relative terms with respect to the parent view. For example, the child view includes an animation that moves the second graphical element 520 along a path 515 to being top center aligned of the parent view, and then move to being bottom right aligned at a destination position 530 of the parent view.

In FIG. 5B, the first graphical element 510 of the parent view has decreased in size, and the second graphical element 520 is now at a second position at the top of the parent view due to the decreased size of the parent view. The destination position 530 of the parent view, corresponding to the bottom right alignment discussed above, has also changed due to the decreased size of the parent view, which also changes the path 515 in which the second graphical element 520 moves along to the bottom right alignment of the parent view.

In FIG. 5C, the first graphical element 510 of the parent view has further decreased in size, and the second graphical element 520 is now at a third position moving along the path 515 which again has changed due to the further decreased size of the parent view. The second graphical element of the child view is animated to move toward the destination position 530 of the parent view, corresponding to the bottom right alignment discussed above, which has again changed due to the further decreased size of the parent view.

In some implementations, a multi-touch driven animation may be supported by the animation module 240 in which a multi-touch gesture is received for animating the parent view and the child view. For example, a first gesture (e.g., two finger pinch on a first hand) may be received which shrinks the size of the parent view, and a second gesture (e.g., a swipe gesture from a second hand) provides an input for animating the child view.

Figure 6:
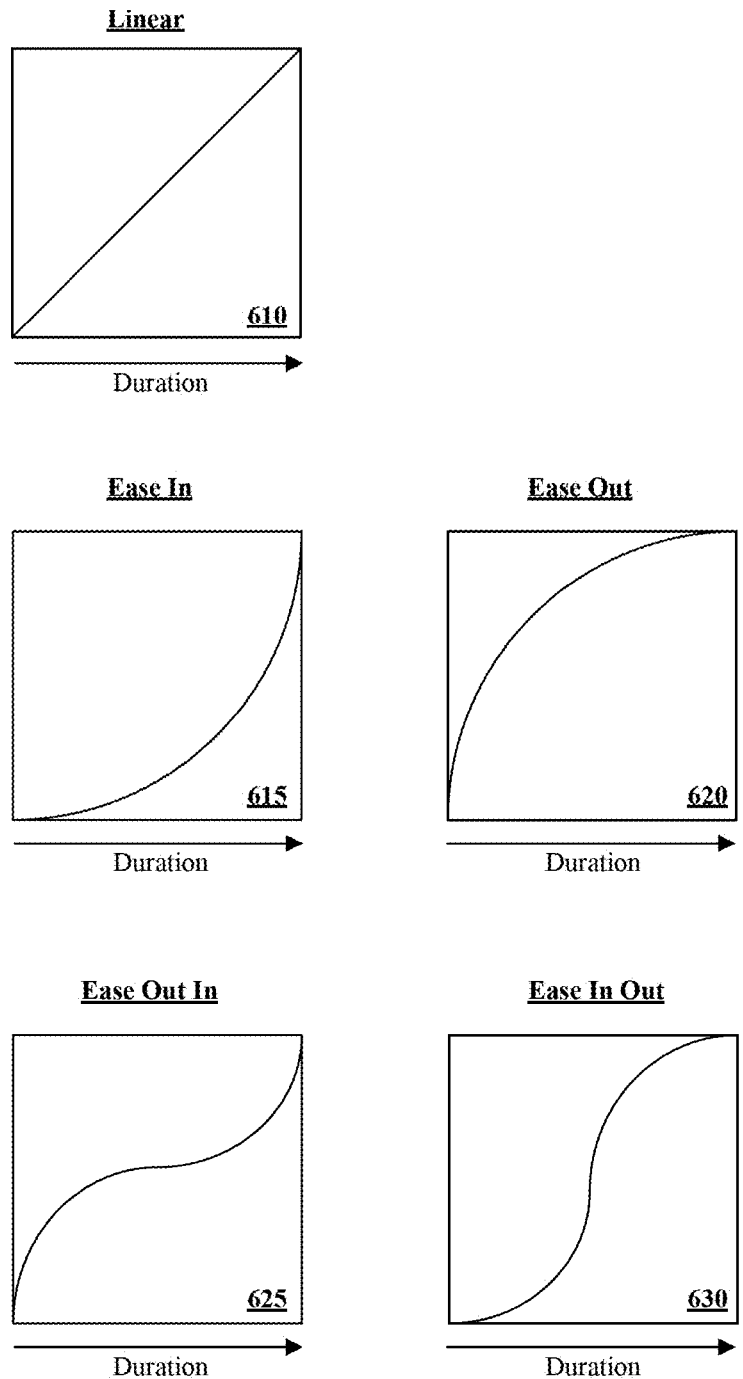
FIG. 6 illustrates examples of animations functions related to timing curves in accordance with one or more implementations.

FIG. 6 illustrates examples of animations functions related to timing curves. A given animation function may include a function describing a timing curve. More specifically, the timing curve functions for the UI framework 200 can be used to define the pacing of an animation over its duration from an initial state to a destination state.

In one or more implementations, a timing curve may be utilized to define an animation that occurs linearly across the entire animation such that the animation moves in an even manner over the entire time duration of the animation. Alternatively, a timing curve may be utilized to define an animation that occurs non-linearly such that the animation may accelerate at the beginning and decelerate at the end of the animation (or vice versa).

As illustrated in FIG. 6, respective timing curves include a linear timing curve 610, an ease in timing curve 615, an ease out timing curve 620, an ease out in timing curve 625, and an ease in out timing curve 630. It is appreciated that other types of timing curves may be provided and still be within the scope of the disclosure. For example, a timing curve that mimics a physics simulation or some other type of physical movement, such as movement of a spring, may be provided.

Figure 7:
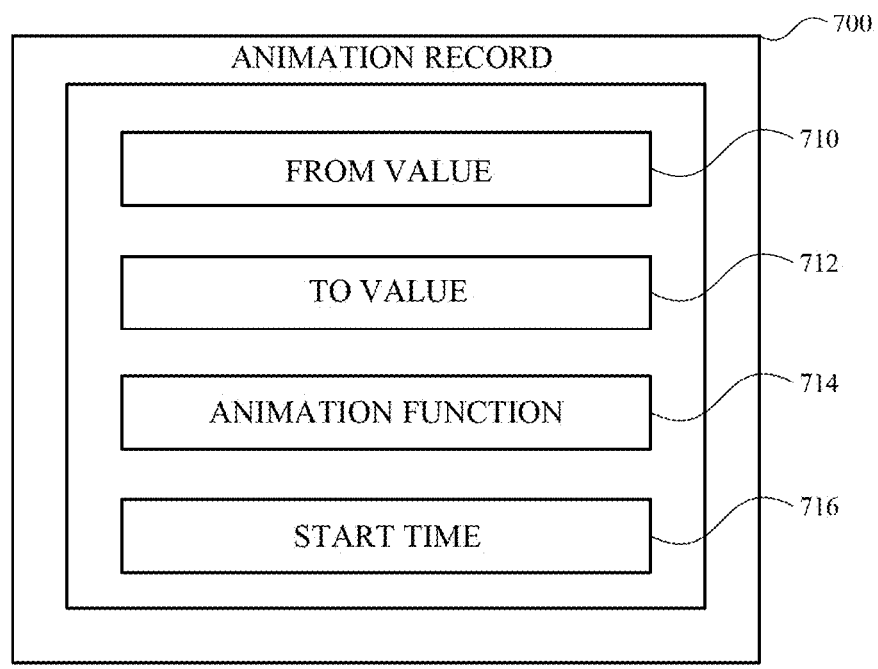
FIG. 7 illustrates an example data structure for an animation record in accordance with one or more implementations.

FIG. 7 illustrates an example data structure for an animation record. The UI framework 200, and in particular the animation module 240, can create an animation record for storing animation information related to a given animation. One or more animation records may be created during the progression of the animation (e.g., depending on whether more than one event such as a second touch input is received). For example, a first animation record may be created for a first touch input, and a second animation record may be created for a second touch input, and the first animation record may be utilized to feed into the second animation record. In some instances involving multiple animation records, such animation records may be eventually merged. For example, in a spring animation, two different animation records may be merged. As illustrated in FIG. 7, an animation record 700 includes a from value 710, a to value 712, an animation function 714, and a start time 716.

In example, the from value 710 can include a value representing an initial state of the animation (e.g., a position of 0), the from value 710 representing a destination state of the animation (e.g., a position of 11). The animation function 714 may be represented as a particular timing curve such a linear animation or an ease-in ease-out animation as discussed above in FIG. 6. Further, the start time 716 may include information for calculating the delta or time offset in connection with calculating an elapsed time.

Figure 8:
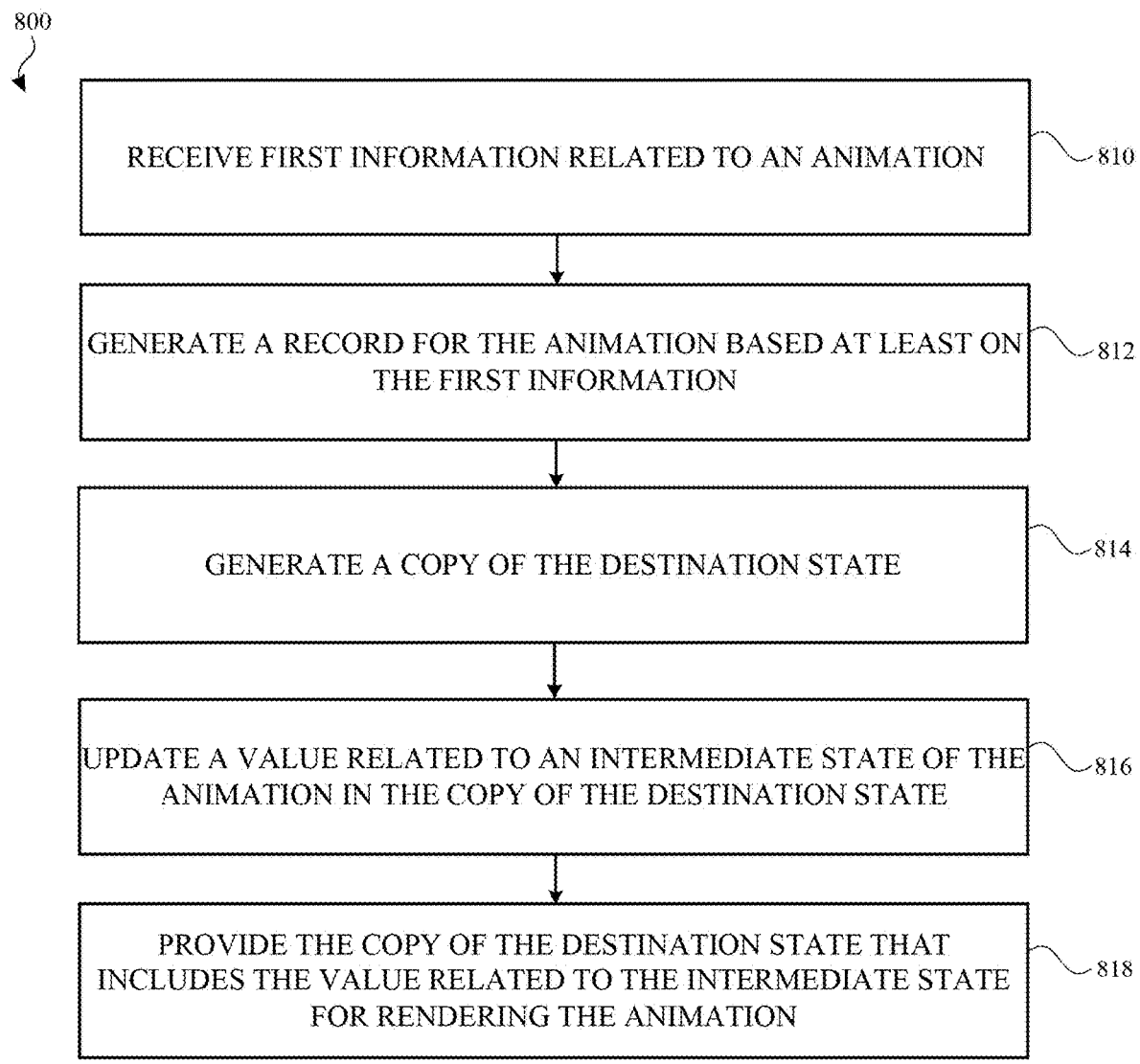
FIG. 8 illustrates a flow diagram of an example process of generating an animation record of a given animation for performing on an electronic device in accordance with one or more implementations.

FIG. 8 illustrates a flow diagram of an example process 800 of generating an animation record of a given animation for performing on an electronic device 110 in accordance with one or more implementations. For explanatory purposes, the process 800 is primarily described herein with reference to the electronic device 110 of FIGS. 1 and 2, particularly with reference to the animation module 240 described above in FIG. 2. However, the process 800 is not limited to the electronic device 110 of FIGS. 1 and 2, and one or more blocks (or operations) of the process 800 may be performed by one or more other components of other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

As illustrated in FIG. 8, the animation module 240 receives first information related to an animation, the first information including an initial state, a destination state, and an animation function (810). In one or more implementations, the animation function corresponds to a function of time such as a timing curve. In another example, the animation function corresponds to a gesture (e.g., gesture-driven and dependent on a current state of the feature) and is not time-dependent. Alternatively, the animation function corresponds to a physics simulation such as a spring-like motion discussed above in FIG. 6. In some implementations, the first information further includes a start time for animation. The animation module 240 may determine an elapsed time based at least in part on a current time and the start time for the animation.

The animation module 240 generates a record of the animation (e.g., the animation record discussed in FIG. 6) including information for the initial state, the destination state, and the animation function (812). The animation module 240 generates a copy of the destination state in which the copy of the destination state is based on the record for the animation (814).

The animation module 240 updates a value related to an intermediate state of the animation in the copy of the destination state, the intermediate state being between the initial state and the destination state (816).

The animation module 240 provides the copy of the destination state that includes the value related to the intermediate state for rendering the animation (818). In an example, an interpolation curve may be applied to blend the animation from the initial state to the destination state based at least in part on the intermediate state.

Figure 9A:
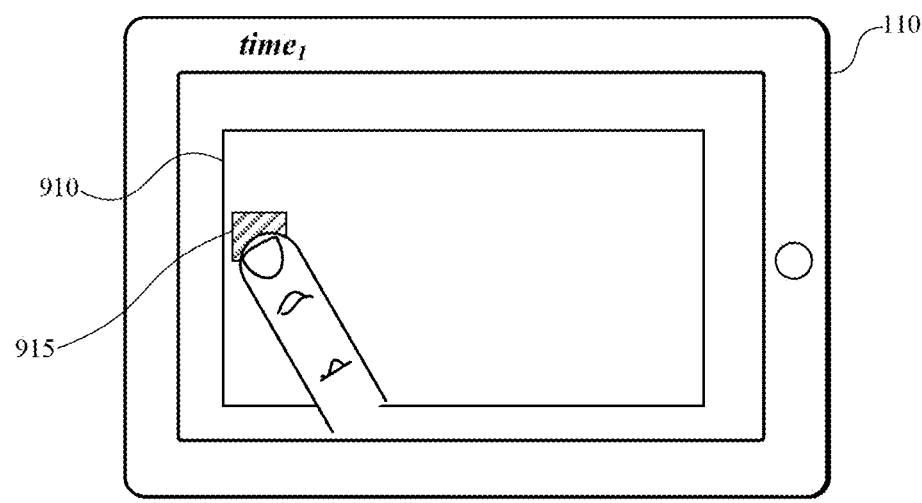
FIGS. 9A-9C illustrate an example of an animation initiated by an input gesture on a touchscreen of the electronic device in accordance with one or more implementations.
Figure 9B:
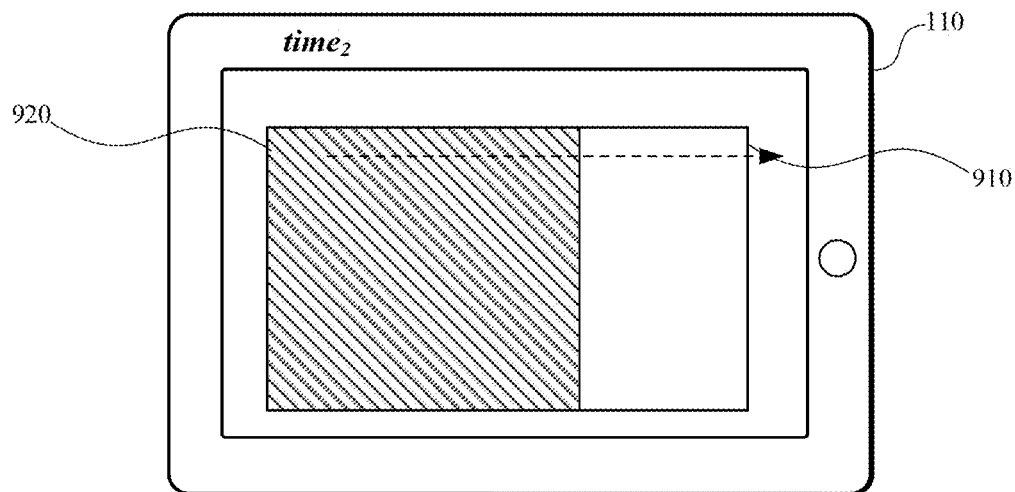
Figure 9C:
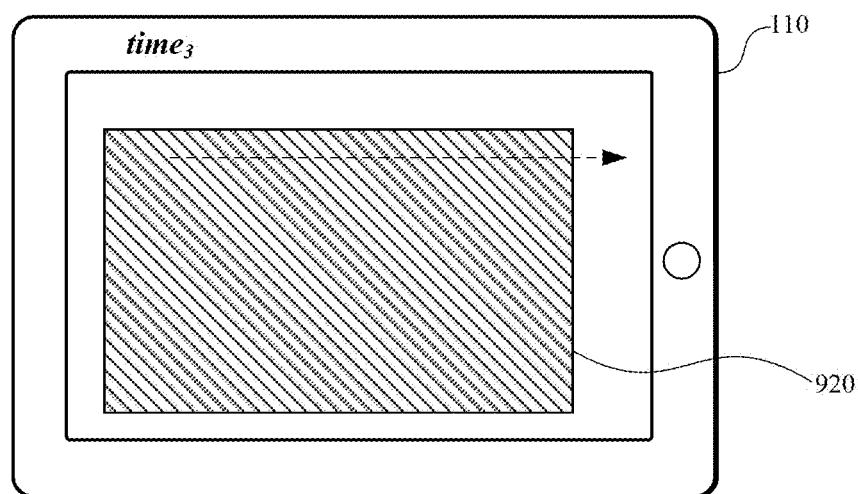

FIGS. 9A-9C illustrate an example of an animation initiated by an input gesture on a touchscreen of the electronic device 110. In some instances, the UI framework 200 supports an animation that is gesture-driven.

In FIG. 9A, a user input, corresponding to a touch input gesture (e.g., a tap), is received at a first graphical element 915 inside a view 910 with a graphical element such as a window or graphical region of a UI. An animation may be initiated based on the received user input.

In FIG. 9B, the animation slides a second graphical element 920, corresponding to a second window or graphical region different than the first graphical element 915, in a horizontal direction across the touchscreen. In FIG. 9C, the animation is completed and the second graphical element 920 is displayed in the view. In an example, although the animation is initiated from the input gesture, the animation may also be defined to complete with a specified amount of time (e.g., 0.3 seconds). In this manner, an input gesture may be utilized as an event to trigger the start of the animation and the duration of the animation is also completed with the specified amount of time. Additionally, it is appreciated that the animation may be tied to a particular timing curve to further specify a speed in which the animation occurs.

Figure 10A:
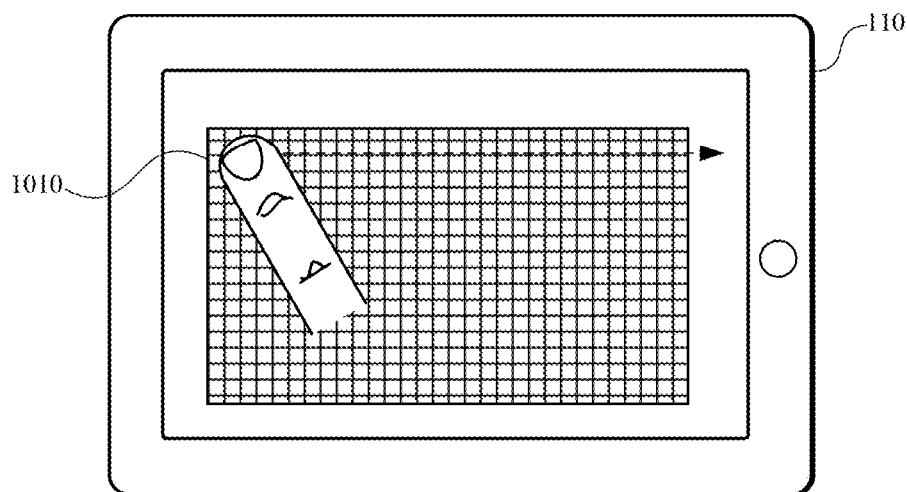
FIGS. 10A-10C illustrate an example of an animation initiated by an input gesture on a touchscreen of the electronic device and then controlled by a gesture until completion in accordance with one or more implementations.
Figure 10B:
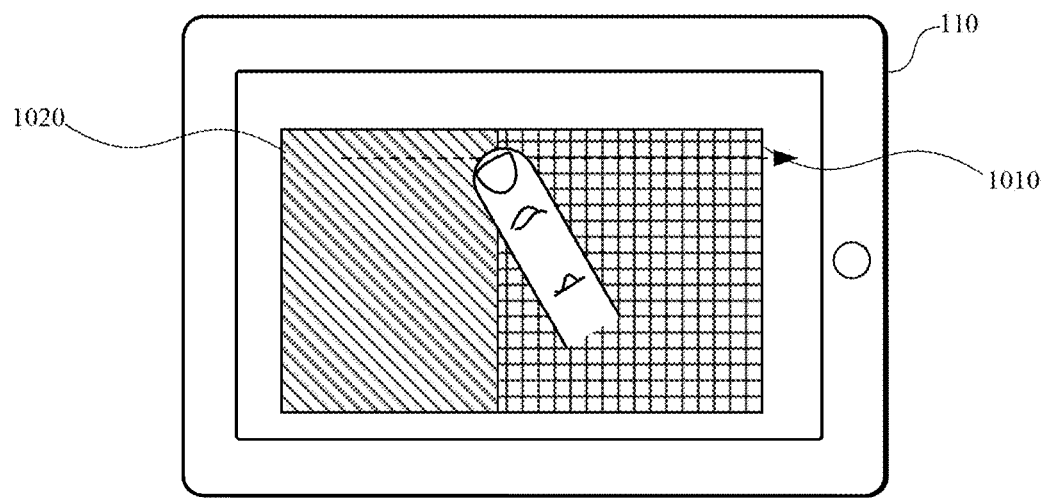
Figure 10C:
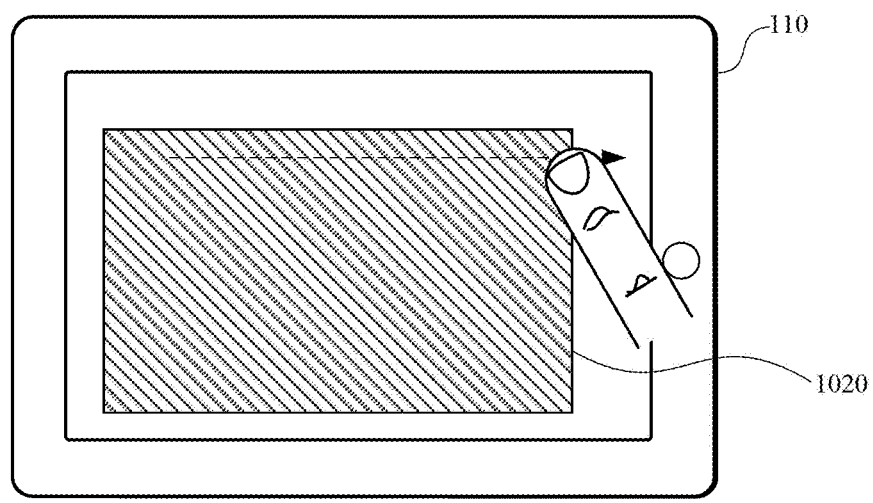

FIGS. 10A-10C illustrate an example of an animation initiated by an input gesture on a touchscreen of the electronic device 110 and then controlled by a gesture until completion. In some instances, the UI framework 200 supports an animation that is gesture-driven and independent of time, with a current state of a gesture determining the progression of the animation.

In FIG. 10A, a user input, corresponding to a touch input, is received inside a view with a first graphical element 1010 such as a window or graphical region of a UI. An animation may be initiated based on the received user input and then controlled as driven by a current state of a gesture such as a sliding drag gesture or swipe across the touchscreen of the electronic device 110.

In FIG. 10B, the movement of the gesture slides a second graphical element 1020, corresponding to a second window or graphical region different than the first graphical element 1010, in a horizontal direction across the touchscreen. In FIG. 10C, the animation is completed after the gesture has moved across the portion of the touchscreen displaying the view, and the second graphical element 1020 is displayed, alone, in the view.

Figure 11A:
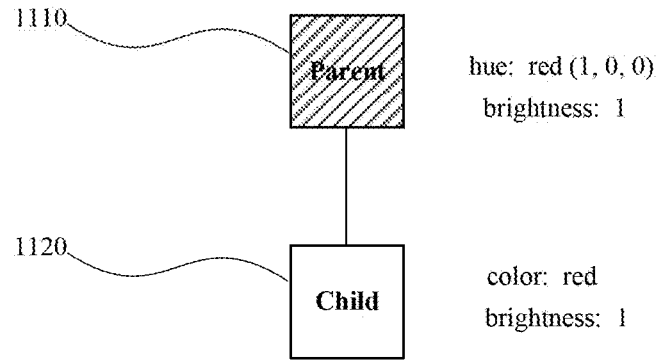
FIGS. 11A-11C conceptually illustrate an example of nested animations involving color properties from a parent view and a child view in accordance with one or more implementations.
Figure 11B:
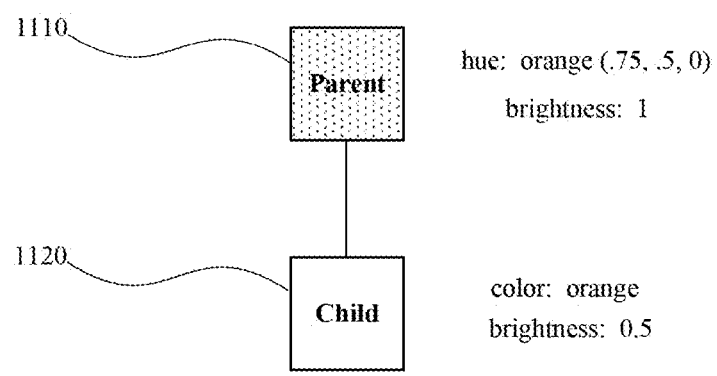
Figure 11C:
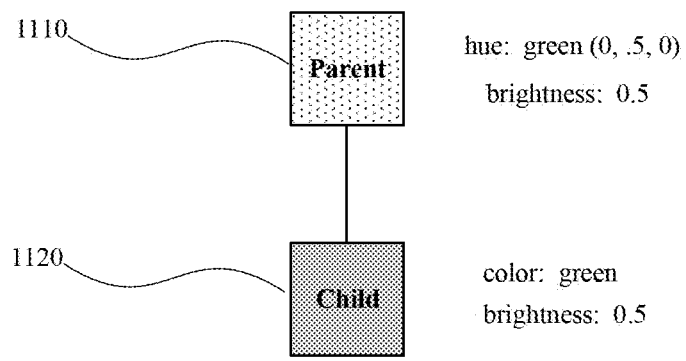

FIGS. 11A-11C conceptually illustrate an example of nested animations involving color properties from a parent view and a child view. In some instances, the UI framework 200 supports having an animation of parent view which impacts an animation associated with a child view (or vice versa).

In FIG. 11A, a parent view 1110 includes color properties with a hue value and a brightness value. The parent view 1110 has a hue value of red and a brightness value of 1. In some implementations, properties related to color are animatable, which means such properties may be utilized in animations and changed from one value to another. The parent view 1110 in this example animates color by changing the hue value and/or the brightness value over time, which will impact an animation of color in the child view 1120. As also shown, a child view 1120 includes color properties of a color value with a value of orange, and a brightness value with a value of 1. The child view 1120 in this example animates color by changing the brightness value of the color. Changes in the values for the properties related to color in the parent view 1110 affects the animation of the brightness value in the child view 1120 as discussed further below.

In FIG. 11B, a value for hue in the parent view 1110 has changed from red to orange. The child view 1120 detects the change in hue in the parent view 1110 and changes its brightness value from 1 to 0.5 and updates its color value to orange.

In FIG. 11C, the parent view 1110 has changed its value for hue from orange to green. The child view 1120 updates its color value to green with respect to the change in the hue value in the parent view 1110. In this manner, the animation in the child view 1120 is changed with respect to the animation occurring in the parent view 1110.

In one or more implementations, the UI framework 200 provides a hierarchy of view nodes representing respective views of a UI. Based on the hierarchy of view nodes, a corresponding hierarchy of nodes representing the underlying data structures is generated to facilitate the storage of properties and/or other information related to such view nodes in a persistent manner, which remains in memory as the view nodes are discarded and/or re-created with updated properties. Additionally, the UI framework 200 provides various protocols to implement different types of view nodes, which are discussed further below.

Figure 12:
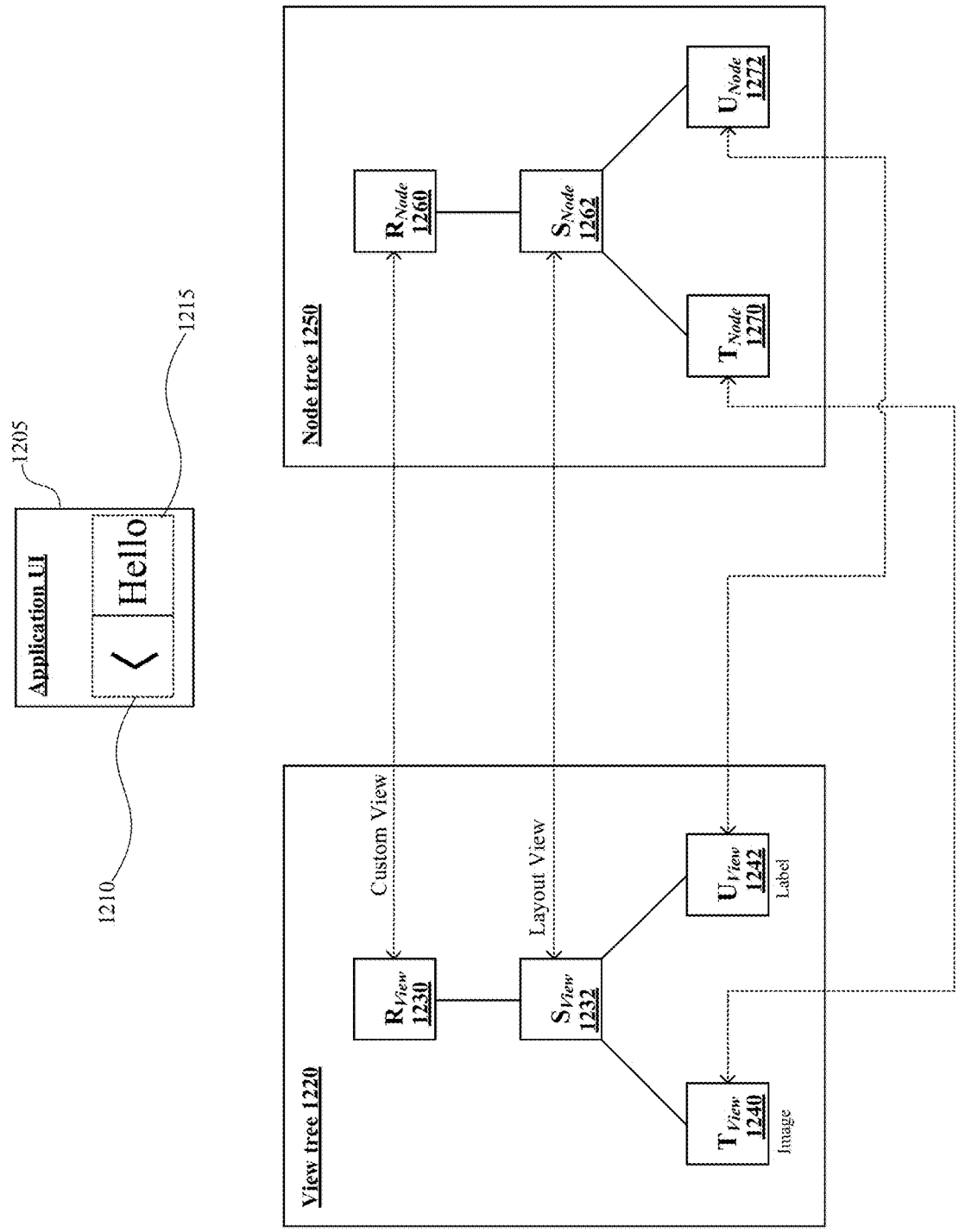
FIG. 12 illustrates an example of a view tree and a node tree with a one-to-one relationship between respective nodes of each tree in accordance with one or more implementations.

FIG. 12 illustrates an example of a view tree 1220 and a node tree 1250 with a one-to-one relationship between respective nodes of each tree in accordance with one or more implementations. The view module 250 creates the view tree 1220 for an application UI 1205 including views for an image 1210 (e.g., a chevron) and text 1215 (e.g., "Hello") shown in the display of the electronic device 110.

The view tree 1220 includes a root node for a custom view node 1230, which has a child node for a layout view node 1232. The layout view node 1232 has two respective child nodes corresponding to an image node 1240 and a label node 1242. The view tree 1220 in an example represents a hierarchy with at least a root node (e.g., the custom view node 1230) corresponding to a root view, which may include one or more child nodes. The root view is the parent view of the entire UI. In the example of FIG. 12, the custom view node 1230 corresponds to a particular type of view supported by the UI framework 200. Each node in a given view tree may correspond to a particular view type such as a custom view or a layout view, or correspond to a property such as color, an image, label, etc.

For storing information related to the view tree 1220 in a persistent manner, the node tree 1250 includes a root node 1260 corresponding to the custom view node 1230 in the view tree 1220. The node tree 1250 further includes a node 1262 corresponding to the layout view node 1232, a node 1270 corresponding to the image node 1240, and a node 1272 corresponding to the label node 1242.

View trees are ephemeral and get recreated frequently and discarded. For example, when an event is received and changes the state of a view tree, then the view module 250 may create a new view tree in response to the event. Thus, a view tree may be considered transient and gets re-generated upon an update (e.g., receiving an input or event that causes a change, such as events, data received over the network, user input (e.g., gesture), and time changes when animation is already running). Further, when a new view tree is generated for portions of the UI that have changed, nodes in the node tree are updated.

In an example, a developer can call an update function on the root node of the view tree 1220, which in turn calls an update for all of its child nodes. For an animation, the update function initiates a creation of an animation record, which stores properties for animation.

In some implementations, instead of a node tree structure (e.g., the node tree 1250), the UI framework 200 provides an attribute graph as discussed further below in the discussion of FIG. 13. An attribute graph may support 0 to n number of inputs, and applies a function on the inputs for calculating an output. The output may be stored in a persistent memory structure, and whenever any of the n inputs get changed then the function gets re-run to generate a new output.

To provide support for different types of views and/or nodes, the software architecture implements various protocols as discussed further. In one or more implementations, protocols are analogous to interfaces in the Java® programming language. Further, protocols as described herein correspond to Swift language structs instead of objects. The following discussion relates to different types of protocols supported by the UI framework 200 for creating UIs and supporting animations.

In one or more implementations, the UI framework 200 provides a view protocol that generally has fundamental definition for a view, and how a node of a view tree and a node of a node tree may interoperate. Further, the view protocol also includes a function for making one or more nodes of a view tree. The following is a discussion of sub-protocols for the view protocol (e.g., corresponding to a type of view). Each of the sub-protocols may include a specific implementation of a function to make nodes of a view tree where the function can receives inputs corresponding to a state of the UI and environment parameters of the UI, and the function provides the generated child node corresponding to that particular view type after being called.

In one or more implementations, the UI framework 200 provides a custom view where a customized UI with one or more views may be defined. Further, in one or more implementations, the UI framework 200 provides different layout view protocols for various layouts of graphical elements, including the following: X Stack protocol for x-axis layouts, Y Stack protocol for y-axis layouts, and a Z Stack protocol for a z-axis layout.

In one or more implementations, the UI framework 200 provides a unary layout protocol, which is similar to the layout view protocol but only has a single child. Some examples of a unary layout protocol include an alignment layout protocol, and a size layout protocol.

To support animations, in one or more implementations, the UI framework 200 provides an animatable view protocol, including sub-protocols for an animation protocol and an animatable protocol. The animation protocol supports, for example, a timing curve animation that is based on timing curves over time (e.g., linear or ease-in ease-out curve over a duration of time), or a physics simulation such as a spring animation. The animatable protocol provides support for any property that can be animated: e.g., color, numbers, vectors, and any property where values may be interpolated.

Further, the animatable view protocol provides combining logic for animating between respective child views, and/or between a parent view and a child view. A discussion of an example of how the combining logic performs follows below. Two events (e.g., a first event, and a second event) may be received for an animatable view. Respective animation records are created for each event based on respective input values including: a from value, a to value, and an start time value. The combining logic combining logic returns for $1^{st}$ event: 1) a $1^{st}$ effective value (e.g., corresponding to new interpolated value); and 2) Boolean value indicating whether the animation has completed. Next, the combining logic returns for $2^{nd}$ event: 1) a $2^{nd}$ effective value based on the $1^{st}$ effective value that is passed as the from value in the input values; and 2) Boolean value indicating whether the second animation has completed.

In one or more implementations, the UI framework 200 provides an event handler protocol (e.g., for gestures). Further, in one or more implementations, the UI framework 200 provides a custom event handler protocol, which is similar to the custom view protocol but is for supporting events. Additionally, in one or more implementations, the UI framework 200 includes a combining event handler protocol, which provides combining logic for child nodes, and/or between parent and child nodes.

Figure 13:
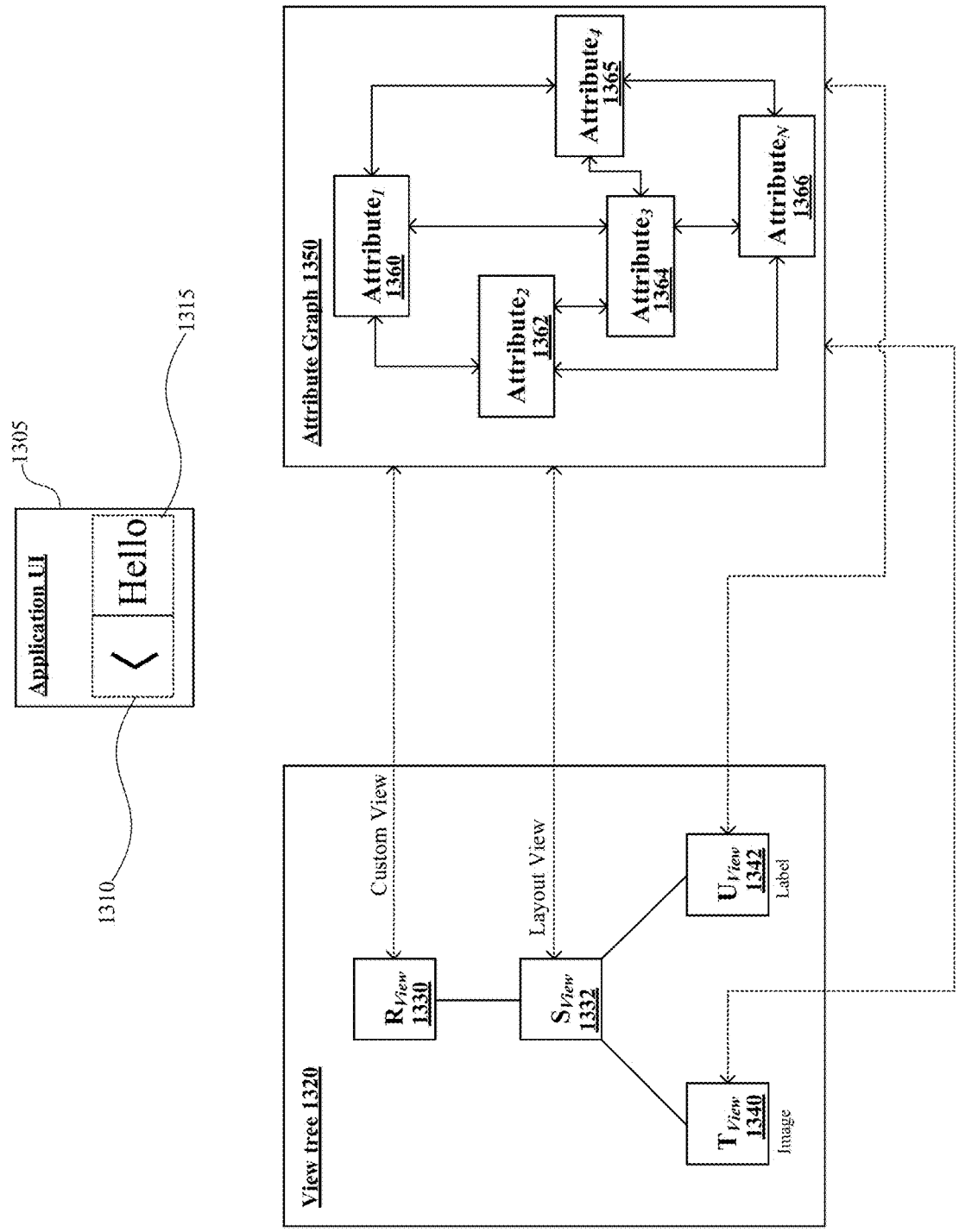
FIG. 13 illustrates an example of a view tree and an attribute graph with a one to n number relationship between the nodes of the view tree and the nodes of the attribute graph in accordance with one or more implementations.

FIG. 13 illustrates an example of a view tree 1320 and an attribute graph 1350 with a one to n number relationship between the nodes of the view tree 1320 and the nodes of the attribute graph 1350 in accordance with one or more implementations. The view module 250 creates the view tree 1320 for an application UI 1305 including views for an image 1310 (e.g., a chevron) and text 1315 (e.g., "Hello") shown in the display of the electronic device 110.

The view tree 1320 is the same as the view tree 1220 shown in FIG. 12. For example, the view tree 1320 includes a root node for a custom view node 1330, which has a child node for a layout view node 1332. The layout view node 1332 has two respective child nodes corresponding to an image node 1340 and a label node 1342.

The attribute graph 1350 includes an n number of nodes that each respectively represent a property or attribute. As shown, the attribute graph 1350 includes an attribute node 1360 for a first attribute, an attribute node 1362 for a second attribute, an attribute node 1364 for a third attribute, an attribute node 1365 for a fourth attribute, and an attribute node 1366 for a n number attribute. Each of the attributes nodes in the attribute graph 1350 may include one or more links to respective other attribute nodes in the attribute graph 1350. Each of the nodes from the view tree 1320 may create one or more of the aforementioned attribute nodes in the attribute graph 1350 in order to associate a particular node in the view tree to such attributes. Thus, when an attribute node in the attribute graph 1350 is updated one or more nodes from the view tree 1320 may be notified.

In one or more implementations, each of the nodes from the view tree 1320 may have a particular number of attributes (e.g., 5 to 10 different attributes) assigned to it from the attribute graph 1350. In an example, such attributes included in the attribute graph 1350 may include, but not limited to, attributes related to a preferred size, rendering output, the view itself (e.g., for indicating a change to the view), dynamic type size, position, size, etc. A node corresponding to a layout view may include attributes for a size and position, etc., for each of its child views, and each of the child views may include attributes for a preferred size (which may be constrained based on the size and/or position attributes from the parent layout view node). A node corresponding to text may include attributes for a preferred size, dynamic type size (e.g., for changing a font size), etc.

In an implementation, the view tree 1320 can be traversed starting from the root node, and each view can be requested to provide a set of attributes corresponding to a set of inputs and a second set of attributes corresponding to a set of outputs for the corresponding view. The set of outputs for a corresponding node in the view tree 1320 can be referred to as a display list in an example. When new inputs are provided (e.g., as events occur over the progression of time), each attribute that is affected by the new inputs can set a dirty bit (e.g., by changing the value to '1') to indicate that the corresponding attribute has been changed based on at least one of the inputs. The view tree 1320 can then be traversed bottom up from a respective child node where attributes that are marked as dirty can initiate an update of respective output attributes at the corresponding node (e.g., thereby changing the output of the corresponding view of that node) based on the updated input attributes.

Figure 14:
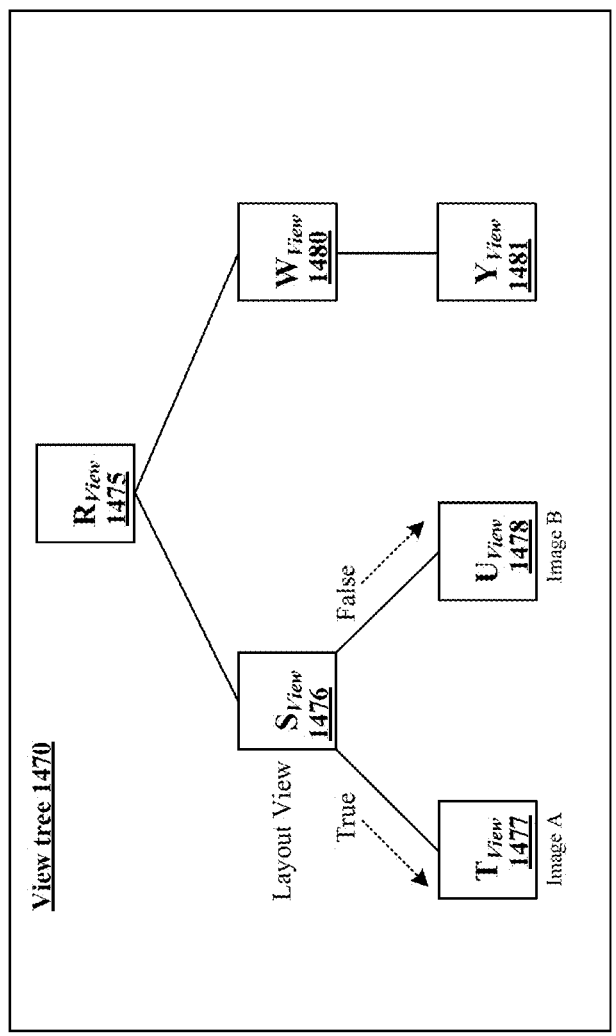
FIG. 14 illustrates an example of a view tree with various types of child nodes, enabling different views of content, from a root node of the view tree in accordance with one or more implementations.

FIG. 14 illustrates an example of a view tree 1470 with various types of child nodes, enabling different views of content, from a root node of the view tree 1470 in accordance with one or more implementations. The view module 250 can create the view tree 1470 for a given application UI including various views of content, based on a given input or a conditional, for displaying on the display of the electronic device 110.

The view tree 1470, as shown, includes a root node 1475 corresponding to a root view, and various child nodes including a child node 1476, a child node 1477, a child node 1478, a child node 1480, and a child node 1481. In particular, child node 1476 corresponds to a layout view that has two respective child nodes corresponding to child node 1477 and child node 1481. As further shown, child node 1477 corresponds to a view for a first image "Image A" and child node 1478 corresponds to a view for a second image "Image B" which is discussed in further detail in the examples below.

In the example of FIG. 14, the view tree 1470 may be implemented, as enabled by the UI framework 200 (e.g., a developer provides additional code), to provide a child view that corresponds to static content, or a child view that corresponds to dynamic content (e.g., a data driven child view). For a given data driven child view, the UI framework 200 can enable configuring a set of data that the child view can handle, and how the child view will construct a view in order to display the data. As illustrated in FIG. 14, child node 1477, and child node 1478 correspond to respective data driven child views of a root node 1475 which is discussed below.

In an implementation, child node 1476 can receive an input that determines whether to display the image corresponding to child node 1477 or the other image corresponding to child node 1478. For example, a particular child view can correspond to a conditional view of content that provides a conditional based selection of a particular view to output for display. For such a child view, in an example, the child view (e.g., child node 1476) may be provided a Boolean value (e.g., a conditional value) as an input, which the child view uses to determine which view among at least two respective views to output for display. Such an input can be, for example, an indication that a selection of a particular portion of the view corresponding to child node 1476 has occurred which is provided as input data to child node 1476. In this example, child node 1476, based on the input, determines to display one of the images in either child node 1477 or child node 1481 based on the Boolean value, such as display the view corresponding to child node 1477 when the Boolean value is true or display the view corresponding to child node 1478 when the Boolean value is false.

In another example, the conditional view of content can provide an optional view of content in which the corresponding child view can display a particular view when the conditional is true but does not display any view when the conditional is false. As an example, this may occur in an application that provides a view when a particular event has occurred (e.g., receiving a new email) such that a particular child view is provided as output for display when the event has occurred, but no view is displayed absent of that event. As shown in the example of FIG. 14, the view corresponding to child node 1477 can be provided as output for display when a true conditional is satisfied. However, in this optional view example, the view corresponding to child node 1478 would not be provided for display.

Figure 15:
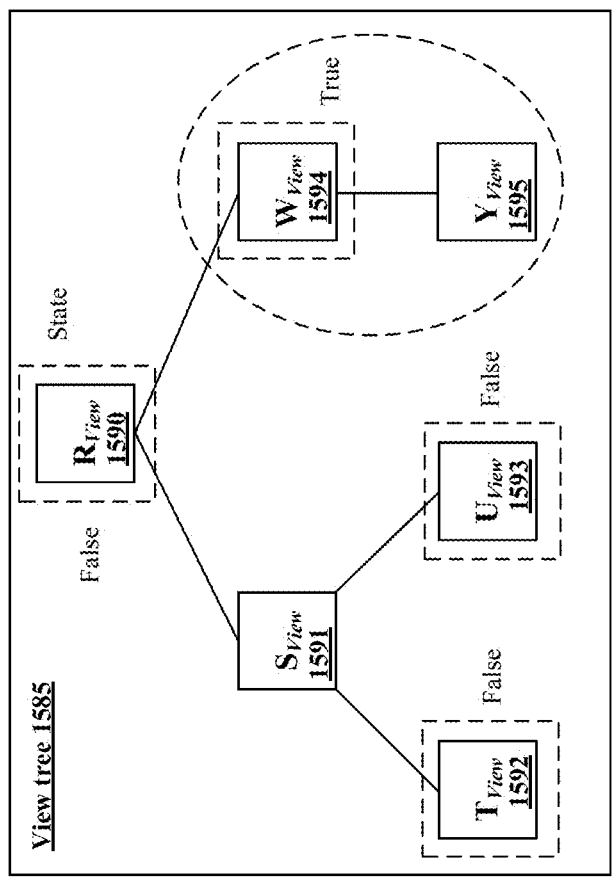
FIG. 15 illustrates an example of a view tree with various nodes that utilize bindings in order to update values of data included in a portion of the nodes in the view tree in accordance with one or more implementations.

FIG. 15 illustrates an example of a view tree 1585 with various nodes that utilize bindings in order to update values of data included in a portion of the nodes in the view tree 1585 in accordance with one or more implementations. The view module 250 can create the view tree 1585 for a given application UI including various views for displaying on the display of the electronic device 110.

The view tree 1585, as shown, includes a root node 1590 corresponding to a root view, and various child nodes including a child node 1591, a child node 1592, a child node 1593, a child node 1594, and a child node 1595. In an implementation, a scope for updating nodes within the view tree 1585 may be established based on binding information associated with each node. For each node that may include data that can be changed, binding information can include a current value for data and a way to update the value of the data (e.g., a location where the data is updated such as a database or a temporary buffer or value), and an indication of whether the current value for data has been read or accessed (e.g., by the application). When a node has data that has been updated and the data has been read in the node based on the associated binding information, the view tree 1585 may be updated at the node to reflect the updated data while forgoing updates at any other nodes within the view tree 1585 where binding information does not indicate that data has been read or accessed.

As shown in FIG. 15, respective binding information is included in root node 1590, child node 1592, child node 1593, and child node 1594. At an initial time, respective binding information indicates (e.g., by having a "false" value) that none of the aforementioned nodes have data that has been read. At a subsequent time, child node 1594 has been read and the binding information is updated (e.g., by having a "true" value). At a further subsequent time, child node 1594 has its data updated. At this time, the binding information of each of the aforementioned nodes is read to determine whether that node is to be updated. In this example, since child node 1594 includes binding information indicating that its data has been read, an update is performed on child node 1594 and its child node 1595, while the other nodes forgo the processing for updates. In this manner, updates to the view tree 1585 can be optimized using the binding information.

Figure 16:
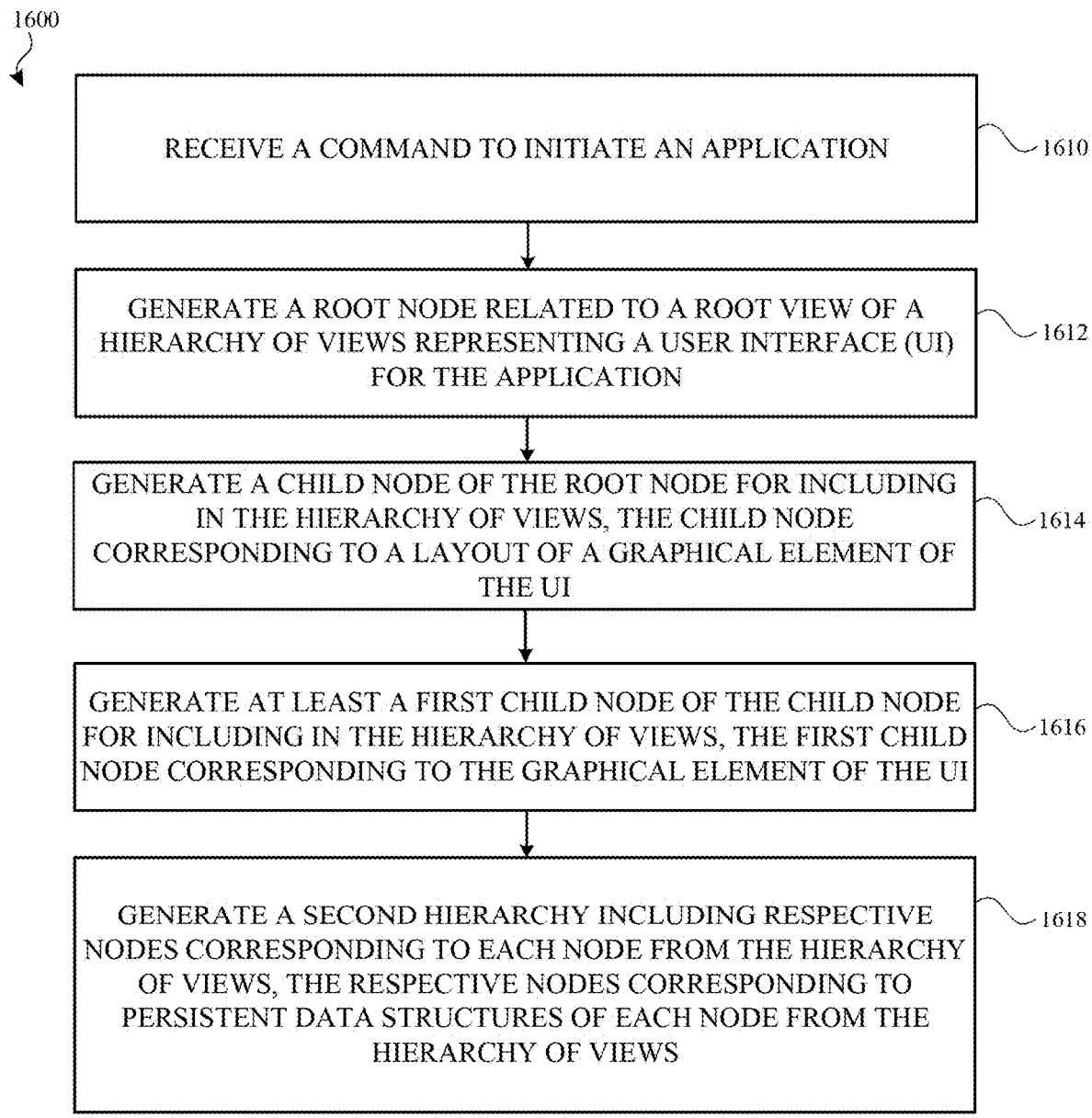
FIG. 16 illustrates a flow diagram of an example process of generating a view tree and a corresponding node tree for performing on an electronic device in accordance with one or more implementations.

FIG. 16 illustrates a flow diagram of an example process 1600 of generating a view tree (e.g., the view tree 1220) and a corresponding node tree (e.g., the node tree 1250) for performing on an electronic device 110 in accordance with one or more implementations. For explanatory purposes, the process 1600 is primarily described herein with reference to the electronic device 110 of FIGS. 1 and 2, particularly with reference to components of the UI framework 200 as described above in FIG. 2. However, the process 1600 is not limited to the electronic device 110 of FIGS. 1 and 2, and one or more blocks (or operations) of the process 1600 may be performed by one or more other components of other suitable devices. Further for explanatory purposes, the blocks of the process 1600 are described herein as occurring in serial, or linearly. However, multiple blocks of the process 1600 may occur in parallel. In addition, the blocks of the process 1600 need not be performed in the order shown and/or one or more blocks of the process 1600 need not be performed and/or can be replaced by other operations.

In one or more implementations, the root process 205 may receive a command to initiate an application, which gets forwarded to the event handler 270 and/or the transaction module 210 that will initiate operations to create a view tree for views of a UI of the application and a corresponding node tree (1610). In response to the command, the view module 250 generates a root node (e.g., the custom view node 1230) related to a root view of a first hierarchy of views representing a UI of the application (e.g., the application UI 1205 in FIG. 12) (1612).

The view module 250 generates a child node (e.g., the layout view node 1232) of the root node for including in the first hierarchy of views, the child node corresponding to a first type of view (1614). The first type of view may include a layout of a graphical element of the UI. In some implementations, the first type of view includes at least one of an X-axis layout, a Y-axis layout, a Z-axis layout, and a radial layout, which are discussed in further detail in FIG. 19 below. Alternatively or conjunctively, the first type of view may be a property that is animated, and the property relates to at least one of a color, a numerical value, a vector, and a particular property where values are interpolated.

The view module 250 generates a first child node (e.g., the image node 1240 or the label node 1242) of the child node for including in the first hierarchy of views, and the first child node corresponds to a second type of view (e.g., an image or a label, etc.) (1616). The node module 260 generates, based at least in part on the hierarchy of views, a second hierarchy (e.g., the node tree 1250 in FIG. 12) including respective nodes corresponding to each node from the hierarchy of views, and the respective nodes correspond to persistent data structures of each node from the hierarchy of views (1618).

Figure 17:
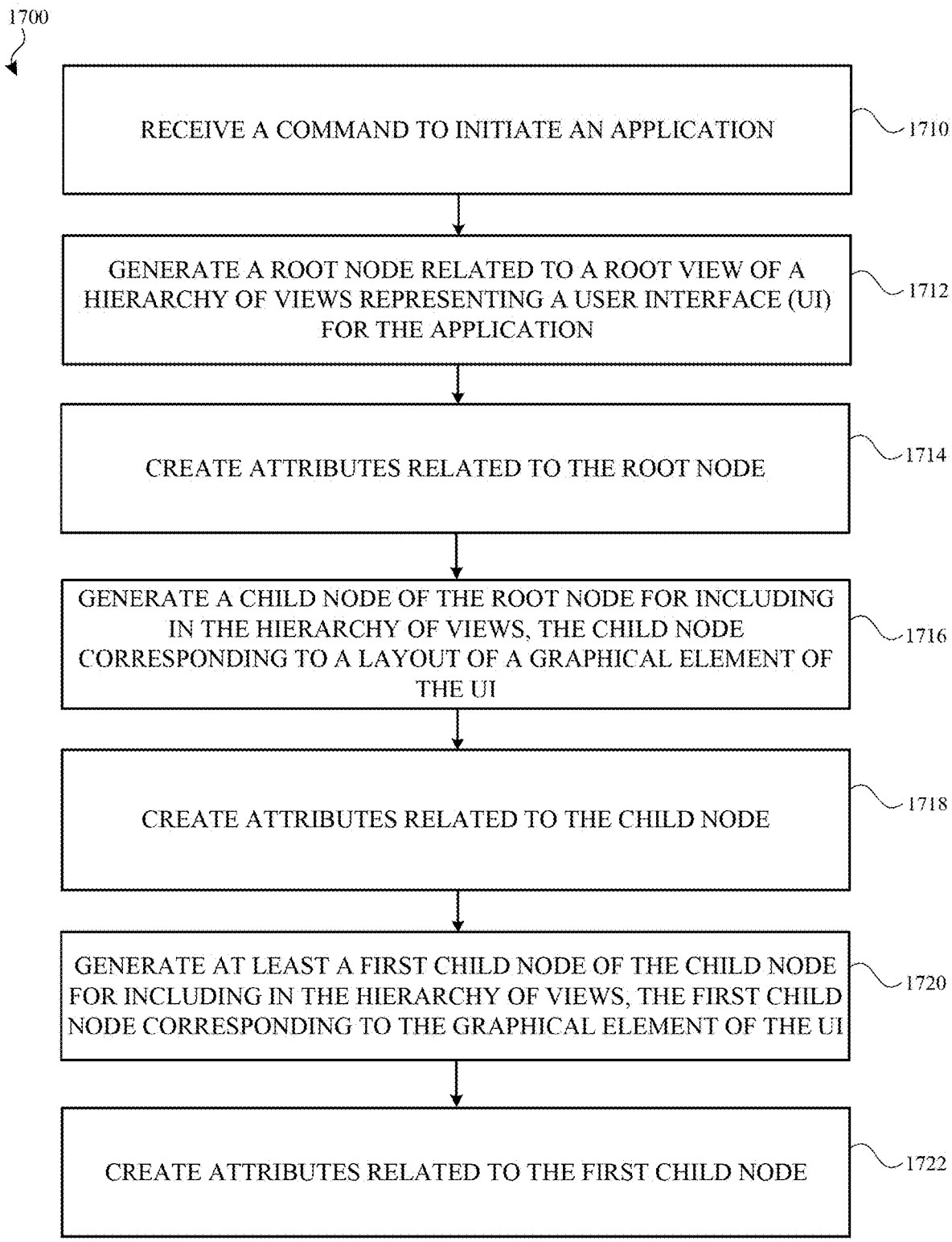
FIG. 17 illustrates a flow diagram of an example process of generating a view tree and a corresponding attribute graph for performing on an electronic device in accordance with one or more implementations.

FIG. 17 illustrates a flow diagram of an example process 1700 of generating a view tree (e.g., the view tree 1320) and a corresponding attribute graph (e.g., the attribute graph 1350) for performing on an electronic device 110 in accordance with one or more implementations. For explanatory purposes, the process 1700 is primarily described herein with reference to the electronic device 110 of FIGS. 1 and 2, particularly with reference to components of the UI framework 200 as described above in FIG. 2. However, the process 1700 is not limited to the electronic device 110 of FIGS. 1 and 2, and one or more blocks (or operations) of the process 1700 may be performed by one or more other components of other suitable devices. Further for explanatory purposes, the blocks of the process 1700 are described herein as occurring in serial, or linearly. However, multiple blocks of the process 1700 may occur in parallel. In addition, the blocks of the process 1700 need not be performed in the order shown and/or one or more blocks of the process 1700 need not be performed and/or can be replaced by other operations.

In one or more implementations, the root process 205 may receive a command to initiate an application, which gets forwarded to the event handler 270 and/or the transaction module 210 that will initiate operations to create a view tree for views of a UI of the application and a corresponding node tree (1710). In response to the command, the view module 250 generates a root node (e.g., the custom view node 1330) related to a root view of a first hierarchy of views representing a UI of the application (e.g., the application UI 1305 in FIG. 13) (1712). The view module 250 creates one or more attributes related to the root node corresponding to the root view (1714). In an example, such attributes are stored as respective nodes in an attribute graph (e.g., the attribute graph 1350).

The view module 250 generates a child node (e.g., the layout view node 1332) of the root node for including in the first hierarchy of views, the child node corresponding to a first type of view (1716). The view module 250 creates one or more attributes related to the child node, which may be stored in the attribute graph (1718). The view module 250 generates a first child node (e.g., the image node 1340 or the label node 1342) of the child node for including in the first hierarchy of views, and the first child node corresponds to a second type of view (e.g., an image or a label, etc.) (1720). The view module 250 creates one or more attributes related to the first child node, which may be stored in the attribute graph (1722).

FIG. 18 illustrates different example code segments for various operations involving a node tree and an attribute graph. The code segments may be provided by a developer and compiled for execution by the UI framework 200. Moreover, the code segments may call one or more APIs provided by the UI framework 200.

As shown in FIG. 18, a code segment 1810 with example code for creating nodes of a view tree is provided. A code segment 1840 is illustrated with example code for initiating an application and creating a view tree. Further, a code segment 1880 is illustrated with example code for initiating an application and creating an attribute graph.

Figure 19:
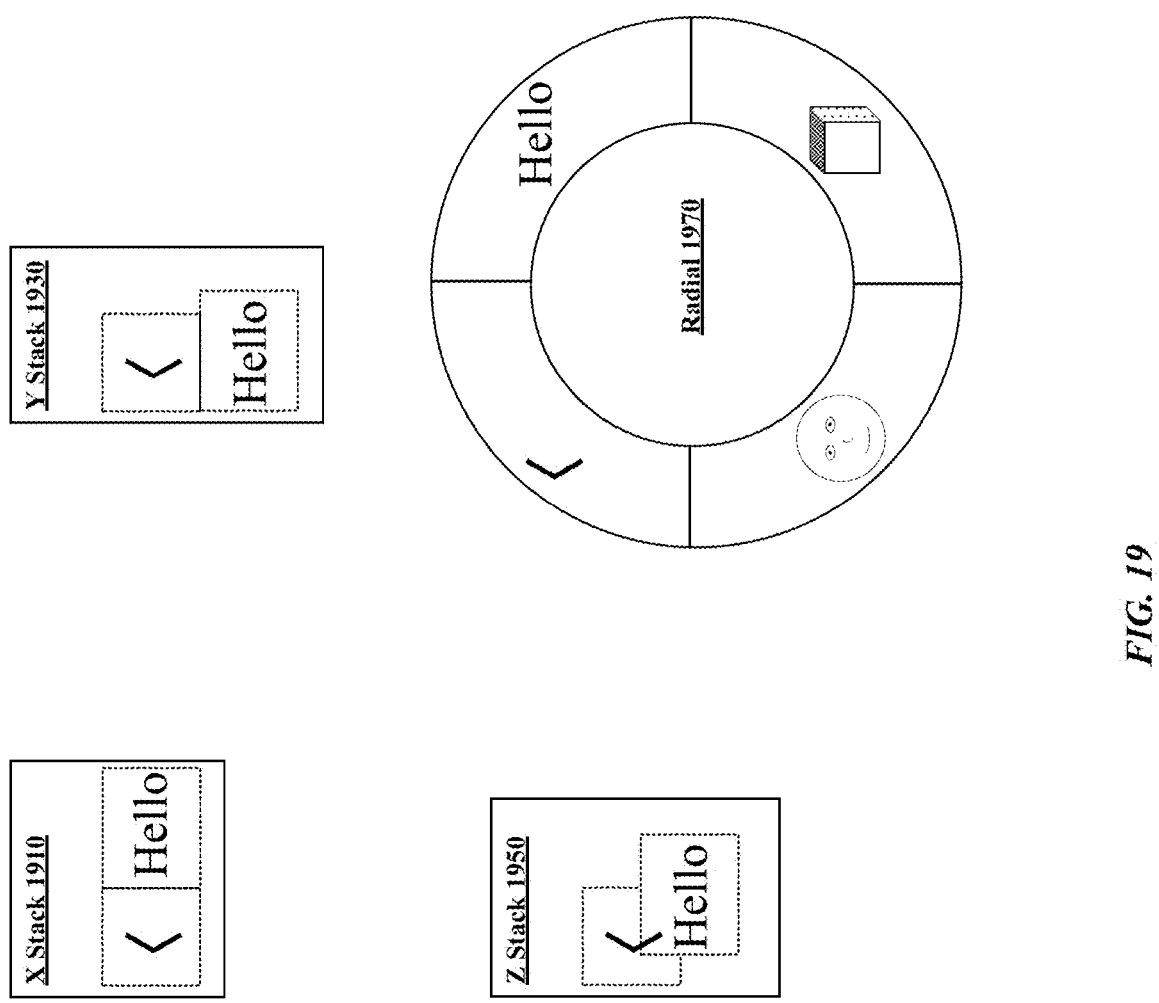
FIG. 19 illustrates different example layouts for graphical elements of a UI that are provided by the UI framework in accordance with one or more implementations.

FIG. 19 illustrates different example layouts for graphical elements of a UI that are provided by the UI framework 200 in accordance with one or more implementations. As discussed above, the UI framework 200 supports various ways to provide layouts for graphical elements. As shown, an X stack layout 1910 is provided for a layout of graphical elements along an x-axis (e.g., horizontally), a Y stack layout 1930 is provided for a layout of graphical elements along a y-axis (e.g., vertically), and Z stack layout 1950 is provided for a layout of graphical elements along a z-axis.

Further, a radial layout 1970 is provided for a layout of graphical elements in a radial arrangement.

The UI framework 200 supports a layout of graphical elements that is expressed in declarative code (e.g., code written using a declarative syntax), potentially easing the burden on a developer by enabling the developer to more easily define the structure of a particular layout without requiring defining a control flow of an application. Based on the declarative code, the API calls corresponding imperative code to perform layout functions. Thus, the UI framework 200 enables the developer to write declarative code that corresponds to a high level description of a layout for graphical elements, and the UI framework 200 automatically calls low level imperative code (e.g., code written using an imperative syntax) that can be executed faster by the electronic device 110. In comparison with declarative code, the imperative code may be written using an imperative syntax that uses statements to change a state of the application. Example code segments including declarative code and imperative code are discussed in more detail with respect to FIG. 21 below.

Figure 20:
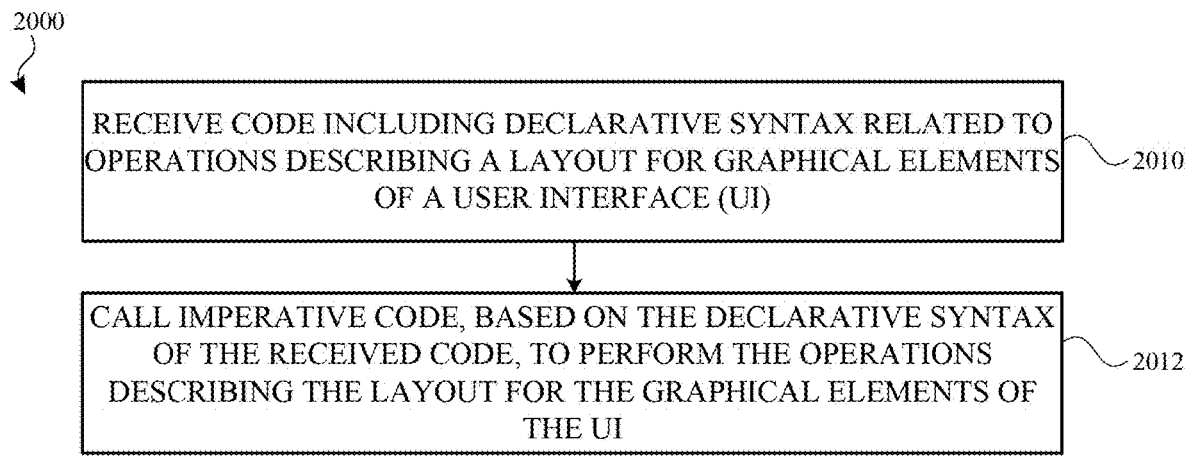
FIG. 20 illustrates a flow diagram of an example process of receiving code in declarative syntax and calling imperative code for performing on an electronic device in accordance with one or more implementations.

FIG. 20 illustrates a flow diagram of an example process 2000 of receiving code in declarative syntax and calling imperative code for performing on an electronic device 110 in accordance with one or more implementations. For explanatory purposes, the process 2000 is primarily described herein with reference to the electronic device 110 of FIGS. 1 and 2, particularly with reference to components of the UI framework 200 as described above in FIG. 2. However, the process 2000 is not limited to the electronic device 110 of FIGS. 1 and 2, and one or more blocks (or operations) of the process 2000 may be performed by one or more other components of other suitable devices. Further for explanatory purposes, the blocks of the process 2000 are described herein as occurring in serial, or linearly. However, multiple blocks of the process 2000 may occur in parallel. In addition, the blocks of the process 2000 need not be performed in the order shown and/or one or more blocks of the process 2000 need not be performed and/or can be replaced by other operations.

The UI framework 200 receives code including declarative syntax related to operations describing a layout for graphical elements of a UI (2010). In an example, the UI framework 200 executes the code including the declarative syntax before calling the imperative code. The UI framework 200 calls imperative code, based at least in part on the declarative syntax of the received code, to perform the operations describing the layout for the graphical elements of the UI (2012). In response to calling the imperative code, the UI framework 200 executes the imperative code in which the imperative code executes in an amount of time less than executing the code including the declarative syntax.

FIG. 21 illustrates different example code segments for declarative code to define a layout and imperative code to change a state of the layout. The code segments may be provided by a developer and compiled for execution by the UI framework 200. Moreover, the code segments may call one or more APIs provided by the UI framework 200.

As shown in FIG. 21, a code segment 2110 with example code in a declarative syntax to define a layout, including a graphical element (e.g., chevron) within a 10×10 sized box, is provided. A code segment 2140 is also illustrated with example code in an imperative syntax that changes the state of the layout when executed.

In one or more implementations, the UI framework 200 provides a preferences system (e.g., as provided by the preferences module 230) to allow a parent view in a view tree to determine preferences related to UI properties from one or more child views of the parent view. A preference list is passed down from the parent view to its children, where each child view may write preferences that are included in the preference list, which then get passed back to the parent view to determine expected UI behavior.

FIGS. 22A-22B conceptually illustrate examples of utilizing a preference list in a view tree to change a state of a particular view for a status bar of a UI. In some instances, a parent view of a view tree may want to change something about itself. However, in order to draw the parent view, the parent view queries its child views about their properties.

For a given application with at least one view for a status bar and a other view for a different portion of the UI (e.g., a main graphical area of the UI), the application may have a dark background or a light background for the other view. Based on this view, the application might want to change the color of the status bar. For example, for an application that is mostly light in color, the application may want a dark status bar and/or the text to be white at the top whereas an application that was predominately dark may want the status bar to be light in color.

As illustrated in FIG. 22A, a view tree 2210 includes a root view node 2220 for an application, and a first child view node 2222 for a main graphical area 2232 of the application, and a second child view node 2224 for a status bar 2230 of the application.

As further shown, for updating the status bar 2230, the root view node 2220 may call an update function provided by the UI framework 200, which initiates the passing of a preference list 2240 downward to each of the child view nodes. While passing the preference list 2240 downward to traverse the view tree 2210, a particular child view node may utilize a preference writing view (not shown) to write a value to a preference in the preference list. Alternatively, the particular child view may write directly into the preference list 2240 to update a particular preference.

In response, the preferences module 230 sends a preference list 2240 to the second child view node 2224. In one implementation, the preference list 2240 includes keys of preferences for a preferred size, a status bar, and color. In an example, the preferences module 230 may communicate with the environment module 220 to coordinate the sending of the preference list. In particular, the preferences module 230 may send a request to the environment module 220 to send the preference list 2240 to the second child view node 2224 (e.g., instead of the preferences module 230 directly sending the preference list 2240).

In FIG. 22B, the second child view node 2224 receives the preference list 2240 as part of the update function called by the root view node 2220. To update the preference for the status bar, the second child view node 2224 passes, as a set of parameters, a particular key (e.g., the status bar color) and a value for that particular key (e.g., dark or light) to a function for calling a preference writing view. This action by the second child view node 2224 creates a preference writing view which also creates an associated preference writing view node. The second child view node 2224 may then call an update function on the preference writing view.

In response, the preference writing view may check the preference list 2240 and determine whether a key of the preference list 2240 matches the particular key previously provided (e.g., a status bar color). Since the particular key matches one of the keys included in the preference list 2240, the preference writing view will update the value of the key for the status bar color in the preference list 2240. In some implementations, the preference list 2240 initially includes default values for each key. The preference writing view now injects the value for the status bar color into the preference list to include this particular key value and update the default value. The preference list 2240 is then passed up to the root view node 2220, which reads the updated value for the status bar color in the preference list 2240 and updates the view for the status bar 2230 to be a dark color.

In one or more implementations, when a preference is set by a given node of the view tree 2210, a pointer to that node is established between a parent node that called an update function and the child node that wrote the preference in the preference list. In this example, since the aforementioned preference writing view associated with the second child view node 2224, wrote a value to the preference list 2240, a relationship is established between the node for the preference writing view and the particular node (e.g., parent node corresponding to the root view node 2220) that asked for the preference. After which, any time an update function gets called by the particular node, the preference writing view (or the second child view node 2224) will send a message to the particular node that asked about the preference so that the particular node can update itself which causes the particular node to reevaluate the preference and get the new value for the preference. For example, if the status bar view (e.g., the second child view node 2224) changed from light to dark, the second child view node 2224 may send the message up to the root view node 2220 which would then cause the view corresponding to the root view node 2220 to reevaluate the view tree 2210 to get back the new preference value for the status bar color in order to update the color of the status bar 2230.

Alternatively, in one or more implementations involving using an attribute graph, initialization of attributes and relationships between parent and child nodes of a given view tree occur before a preference list is passed down to the child nodes. As a result, the above discussion of establishing a pointer between a child node and a parent node does not occur after the preference key is written by the child node.

Further, in some implementations, it is appreciated that additional preferences may be added to the preferences list 2240. For example, a particular view node of the view tree may also add additional preferences if there are properties that the view node wants to set as a preference.

In some implementations, the preferences module 230 provides special combiner rules to resolve potential conflicts between preferences. For example, when a first view writes a preference for a light status bar and a second view writes a preference for a dark status bar, a rule may be utilized to determine how multiple values are evaluated together to get a single value for the preference. In this example, the rule may provide a light status bar when preferences conflict with each other.

FIG. 23A conceptually illustrates an example of utilizing a preferences list in a view tree to change a size of a particular view of a UI. The example of FIG. 23 relates to updating a preference for a preferred size of a particular graphical UI element.

In one or more implementations, a preferred size relates to a preference for intelligently deciding how to divide up the space in between graphical elements that are displayed in an application. For example, for a given layout such as an X stack, the X stack might include a particular amount of space assigned to the X stack in a table view. In response to a change to one of the graphical elements in the X stack (e.g., an amount of text), a value for a preferred size of that graphical element may be written into the preference list to update the size of the view of the graphical element. The root node of the view tree may then call for an update from its child nodes to draw the X stack on the screen.

As illustrated in FIG. 23A, a view tree 2310 includes a root view node 2320 for an application, and a first child view node 2322 for an X stack layout view of the application, and a second child view node 2324 for a status bar (not shown) of the application. The first child view node 2322 includes child view nodes 2325, 2326, and 2327 respectively corresponding to graphical elements 2350, 2352, and 2354 (e.g., image, short text, long text) in the X stack layout view.

In response to an event that updates the text of the graphical element 2354 (e.g., changing longer text to shorter text), the root view node 2320 may call an update function provided by the UI framework 200, which initiates the passing of a preference list 2330 downward to each of the child view nodes. Although not shown, alternatively, in some implementations, the first child view node 2322 may instead call an update function directly on its child view nodes 2325, 2326, and 2327.

In response, the preferences module 230 sends a preference list 2330 to the first child view node 2322. In one implementation, the preference list 2330 includes keys of preferences for a preferred size, a status bar, and color. Each of the keys in the preference list 2330 may have a particular value as shown in preference values 2335. For example, the preferred size key may have a value of "Size1", the status bar key may have a value of "light" and the color key may have a value of "Color123". As further shown in FIG. 23A, the first child view node 2322 receives the preference list 2330 as part of the update function called by the root view node 2320. The first child view node 2322 may forward the preference list 2330 to each of the child view nodes 2325, 2326, and 2327.

To update the preference for the preferred size in response to the changed text, the child view node 2327 passes, as a set of parameters, a particular key (e.g., a preferred size) and a value for that particular key (e.g., a smaller size than the current size since the text is shorter) to a function for calling a preference writing view. This action by the child view node 2327 creates a preference writing view which also creates an associated preference writing view node. The child view node 2327 may then call an update function on the preference writing view. In response, the preference writing view may check the preference list 2330 and determine whether a key of the preference list 2330 matches the particular key previously provided (e.g., a preferred size). The preference writing view updates the value of the key for the preferred size of the graphical element 2354 in the preference list 2330. After updating the value, each of the keys in the preference list 2330 may have a particular value as shown in the preference values 2335. For example, as shown in FIG. 23B, the preferred size key may now an updated value of "Size2", while the values for the status bar key the color key are unchanged. As shown in FIG. 23B, the preference list 2330 is then passed up to the root view node 2020, which reads the updated value for the preferred size key in the preference list 2330 and updates the view for X stack layout to have a different size of the graphical element 2354 to accommodate for the shorter text.

In some implementations, the preferences module 230 provides special combiner rules to resolve potential conflicts between preferences. For example, for different preferred sizes, the preferences module 230 may add up the preferred sizes together, take an average of the preferred sizes, or select the largest value among the preferred sizes, etc., to determine the preferred size preference for the parent.

Figure 24:
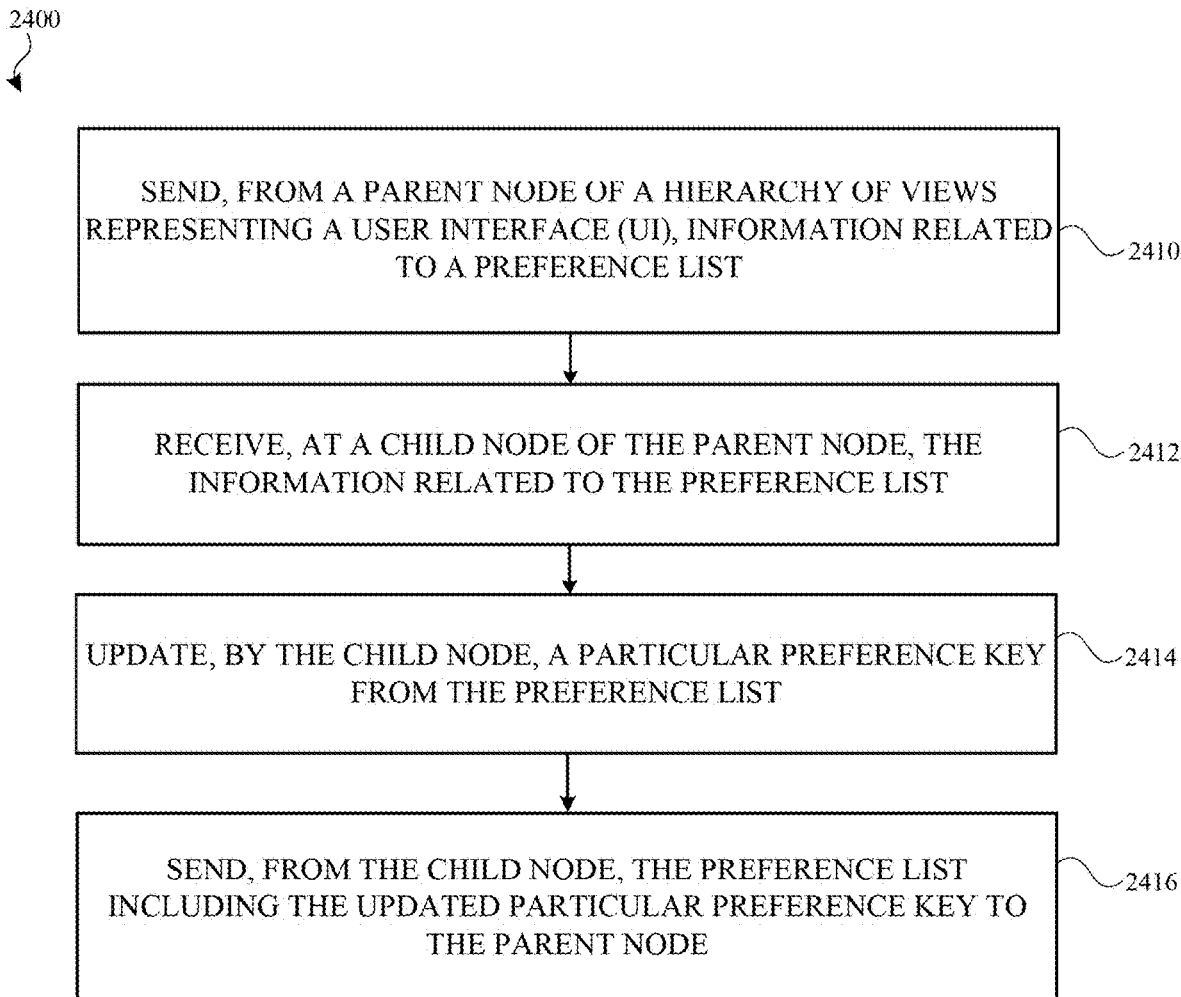
FIG. 24 illustrates a flow diagram of an example process of updating a preference list for performing on an electronic device in accordance with one or more implementations.

FIG. 24 illustrates a flow diagram of an example process 2400 of updating a preference list for performing on an electronic device 110 in accordance with one or more implementations. For explanatory purposes, the process 2400 is primarily described herein with reference to the electronic device 110 of FIGS. 1 and 2, particularly with reference to components of the UI framework 200 as described above in FIG. 2. However, the process 2400 is not limited to the electronic device 110 of FIGS. 1 and 2, and one or more blocks (or operations) of the process 2400 may be performed by one or more other components of other suitable devices. Further for explanatory purposes, the blocks of the process 2400 are described herein as occurring in serial, or linearly. However, multiple blocks of the process 2400 may occur in parallel. In addition, the blocks of the process 2400 need not be performed in the order shown and/or one or more blocks of the process 2400 need not be performed and/or can be replaced by other operations. The example process 2400 in FIG. 24 discusses an implementation that updates preferences between parent and child view nodes of a view tree using a preference list.

In one or more implementations, the UI framework 200 sends, from a parent node of a hierarchy of views, information related to a preference list, the preference list including preference keys corresponding to respective attributes of a UI (2410). The UI framework 200 receives, at the child node of the parent node, the information related to the preference list (2412).

The UI framework 200 updates, at the child node, a particular preference key from the preference list to a particular value, the particular preference key related to the attribute of the UI (2414). In an example, after updating, an indication of a dependency (e.g., a pointer) between the child node to the parent node, related to an attribute of the UI, may be generated where the indication can be utilized for a subsequent update of the attribute of the UI. Additionally, the UI framework 200 sends, after the particular preference key was updated by the child node, the preference list including the updated particular preference key to the parent node (2416). Further, the UI framework 200 updates, at the parent node, the attribute of the UI based at least in part on the updated particular preference key sent from the child node.

In an example, at a subsequent time, the UI framework 200 updates, at the child node, the particular preference key to a different value from the particular value. In response to the child node updating the particular preference key to the different value, the UI framework 200 updates, at the parent node, the attribute of the UI based at least in part on the different value and the indication of the dependency between the child node and the parent node.

FIG. 25 illustrates a flow diagram of an example process 2500 of updating an attribute related to a particular view for performing on an electronic device 110 in accordance with one or more implementations. For explanatory purposes, the process 2500 is primarily described herein with reference to the electronic device 110 of FIGS. 1 and 2, particularly with reference to components of the UI framework 200 as described above in FIG. 2. However, the process 2500 is not limited to the electronic device 110 of FIGS. 1 and 2, and one or more blocks (or operations) of the process 2500 may be performed by one or more other components of other suitable devices. Further for explanatory purposes, the blocks of the process 2500 are described herein as occurring in serial, or linearly. However, multiple blocks of the process 2500 may occur in parallel. In addition, the blocks of the process 2500 need not be performed in the order shown and/or one or more blocks of the process 2500 need not be performed and/or can be replaced by other operations. The example process 2500 in FIG. 25 discusses an implementation that initializes attributes and establishes relationships between parent and child nodes using an attribute graph.

In one or more implementations, the UI framework 200 initializes a set of attributes related to a hierarchy of views representing a user interface (UI), the hierarchy of views including a parent node and a child node (2510). In an example, initializing the set of attributes creates an attribute graph including respective nodes related to attributes for each of the view nodes from the hierarchy of views. Each of the nodes in the attribute graph may have links to one or more other attributes nodes to indicate a dependency between respective attributes.

In the example where the attribute graph is utilized for updating attributes, a particular attribute node from the attribute graph may be updated directly. The UI framework 200 updates a particular attribute from the set of attributes (2512). In an example, the particular attribute may correspond to an attribute node related to a child view node from the hierarchy of views. Based on the update to the attribute of the child view, a change to an attribute node related to a parent view may occur based on the update to the attribute of the child view.

To provide full interoperability with existing drawing frameworks (e.g., UI Kit, App Kit, Metal, etc.), the UI framework 200 provides an extensible renderer view system for enabling view nodes to draw themselves. In one or more implementations, each view node can convert itself into drawing commands that are compatible with a given external drawing framework.

Figure 26:
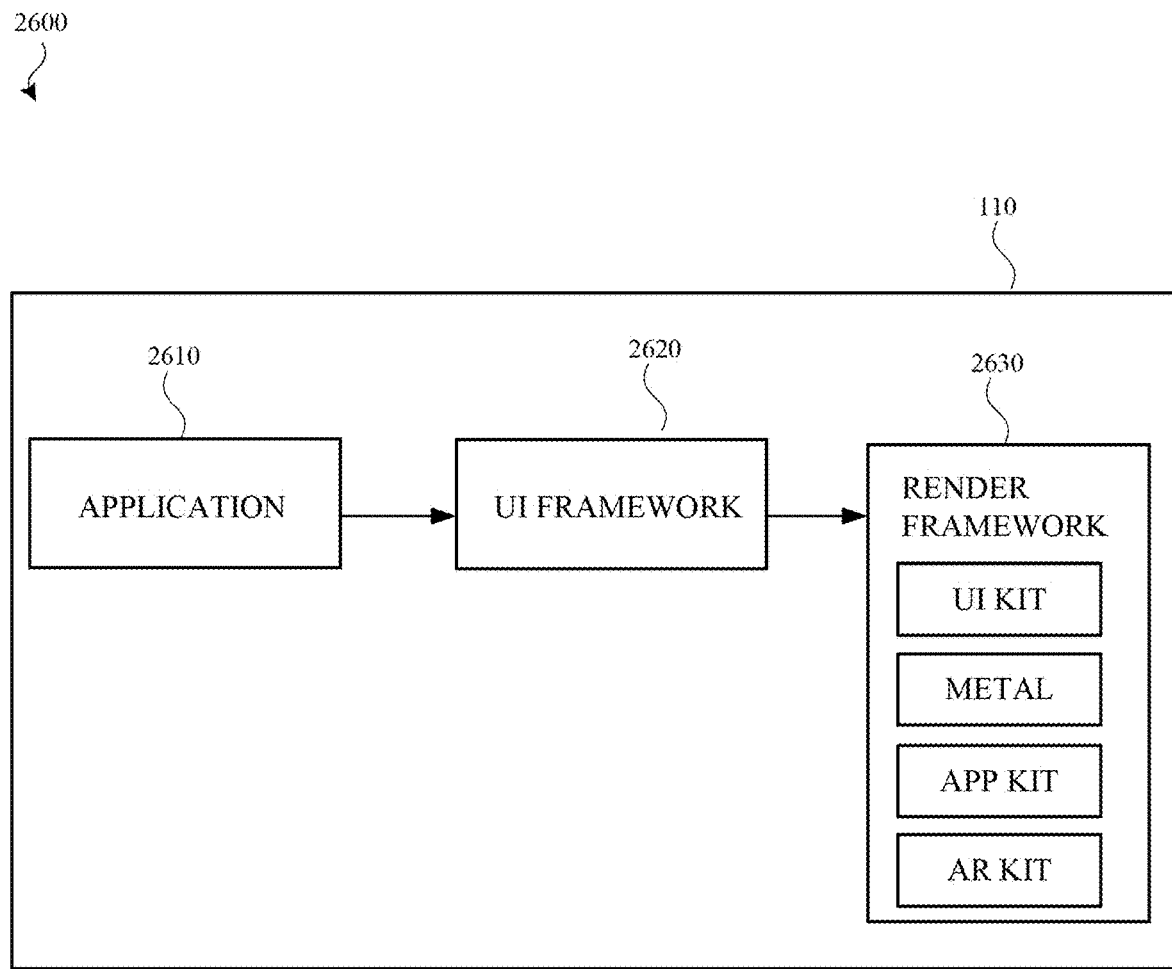
FIG. 26 illustrates an example renderer view system 2300 for supporting interoperability with different drawing frameworks which may be executed on the electronic device in accordance with one or more implementations.

FIG. 26 illustrates an example renderer view system 2600 for supporting interoperability with different drawing frameworks which may be executed on the electronic device 110.

In one or more implementations, the renderer view system is an extensible drawing system that facilitates interoperability with external drawing frameworks. Some examples of drawing frameworks include: 1) UI Kit (iOS) that uses persistent classes modeled in a tree structure; 2) App Kit (MacOS) that also uses persistent classes modeled in a tree structure; 3) Metal (iOS & MacOS) that provides low level GPU drawing in a framebuffer, generally more difficult for a developer to code but may result in faster rendering, and sends imperative drawing commands instead of building of a hierarchy for rendering views; and/or generally any drawing framework; and 4) AR Kit which enables 3D rendering in 2D environments and for use in 2D and 3D applications. Accordingly, it is appreciated that the renderer view system 2600 could support any type or number of drawing frameworks and still be within the scope of the subject technology.

As illustrated in FIG. 26, the renderer view system 2600 includes an application 2610 that calls functions provided by a UI framework 2620 (e.g., provided by the UI framework 200). The UI framework 2620 converts the function call into a command that is compatible with a particular drawing framework provided in a render framework 2630.

In one or more implementations, each node in a given view tree knows how to convert itself into a format compatible with the drawing commands from the external drawing framework. For example, operations performed in connection with a view tree structure and a node tree structure for animations, gestures, etc., eventually get drilled down into a label, image or color that knows how to draw itself, e.g. that corresponds to particular code for drawing itself.

In one or more implementations, the renderer view system 2600 utilizes a separate tree hierarchy for a renderer view called a render view tree. The render view tree may be a sparser tree than node tree structure described above because most views in the UI framework do not actually draw. For example, a custom view does not draw or render anything, and only creates other views that draw and render. For example, a layout view does not draw or render, and only calculates frames for the particular views that actually do draw. A render view tree may include one node for root and respective nodes for views that draw. Moreover, in an example, a render view tree is instructed to draw itself by 1) updating properties that a particular drawing framework (e.g., UI Kit or App Kit) uses, or 2) sending out rendering commands for a different framework (e.g., Metal).

Figure 27:
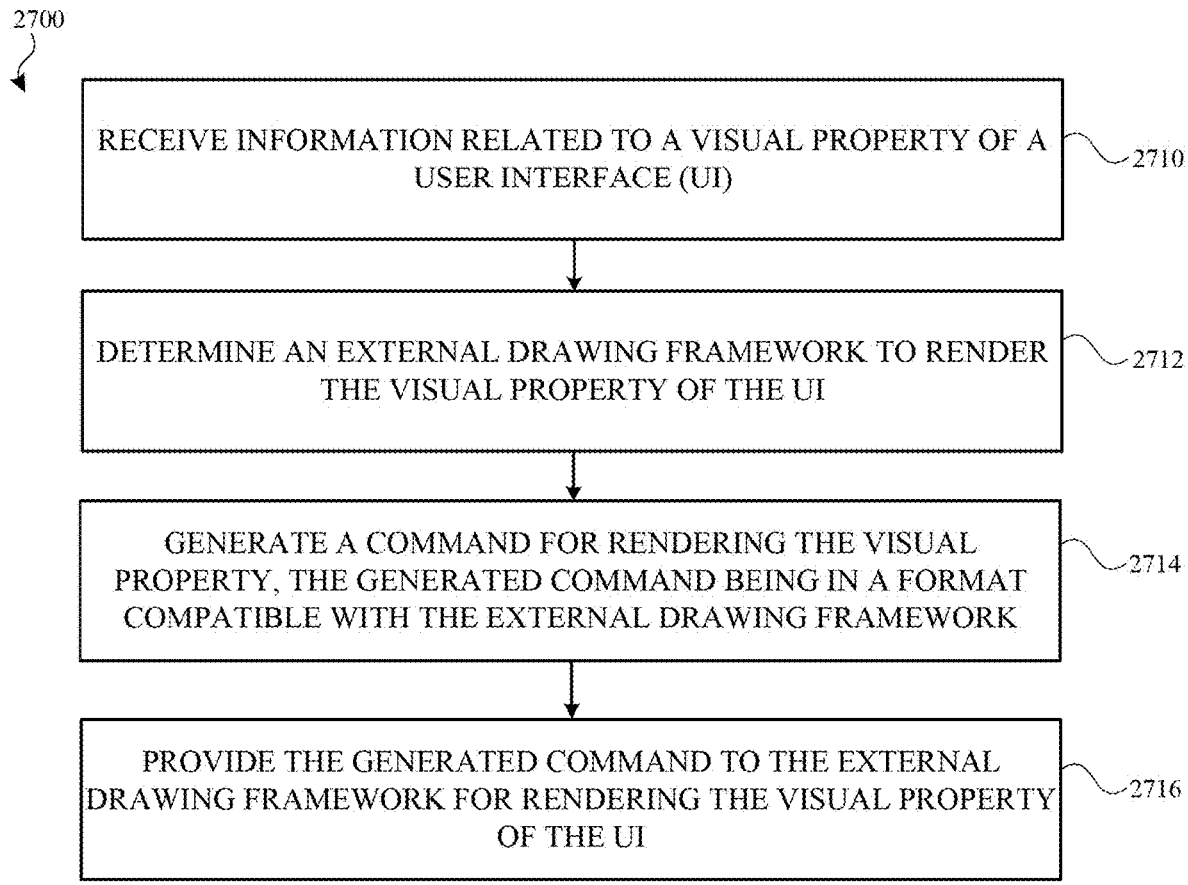
FIG. 27 illustrates a flow diagram of an example process of generating a command for rendering a visual property and providing the command to an external drawing framework for performing on an electronic device in accordance with one or more implementations.

FIG. 27 illustrates a flow diagram of an example process 2700 of generating a command for rendering a visual property and providing the command to an external drawing framework for performing on an electronic device 110 in accordance with one or more implementations. For explanatory purposes, the process 2700 is primarily described herein with reference to the electronic device 110 of FIGS. 1, 2, and 24, particularly with reference to components of the renderer view system 2400 as described above in FIG. 24. However, the process 2700 is not limited to the electronic device 110 of FIGS. 1, 2, and 24, and one or more blocks (or operations) of the process 2700 may be performed by one or more other components of other suitable devices. Further for explanatory purposes, the blocks of the process 2700 are described herein as occurring in serial, or linearly. However, multiple blocks of the process 2700 may occur in parallel. In addition, the blocks of the process 2700 need not be performed in the order shown and/or one or more blocks of the process 2700 need not be performed and/or can be replaced by other operations.

The UI framework 2420 receives information related to a visual property of a user interface (UI), the visual property including at least one of a label, image, or color (2710). The UI framework 2420 determines an external drawing framework to render the visual property of the UI (2712).

Based on the determined external drawing framework, the UI framework 2420 generates a command for rendering the visual property, the generated command being in a format compatible with the external drawing framework (2714). The UI framework 2420 provides the generated command to the external drawing framework for rendering the visual property of the UI (2716).

As described above, one aspect of the present technology is the gathering and use of data available from specific and legitimate sources to improve the delivery to users of invitational content or any other content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Figure 28:
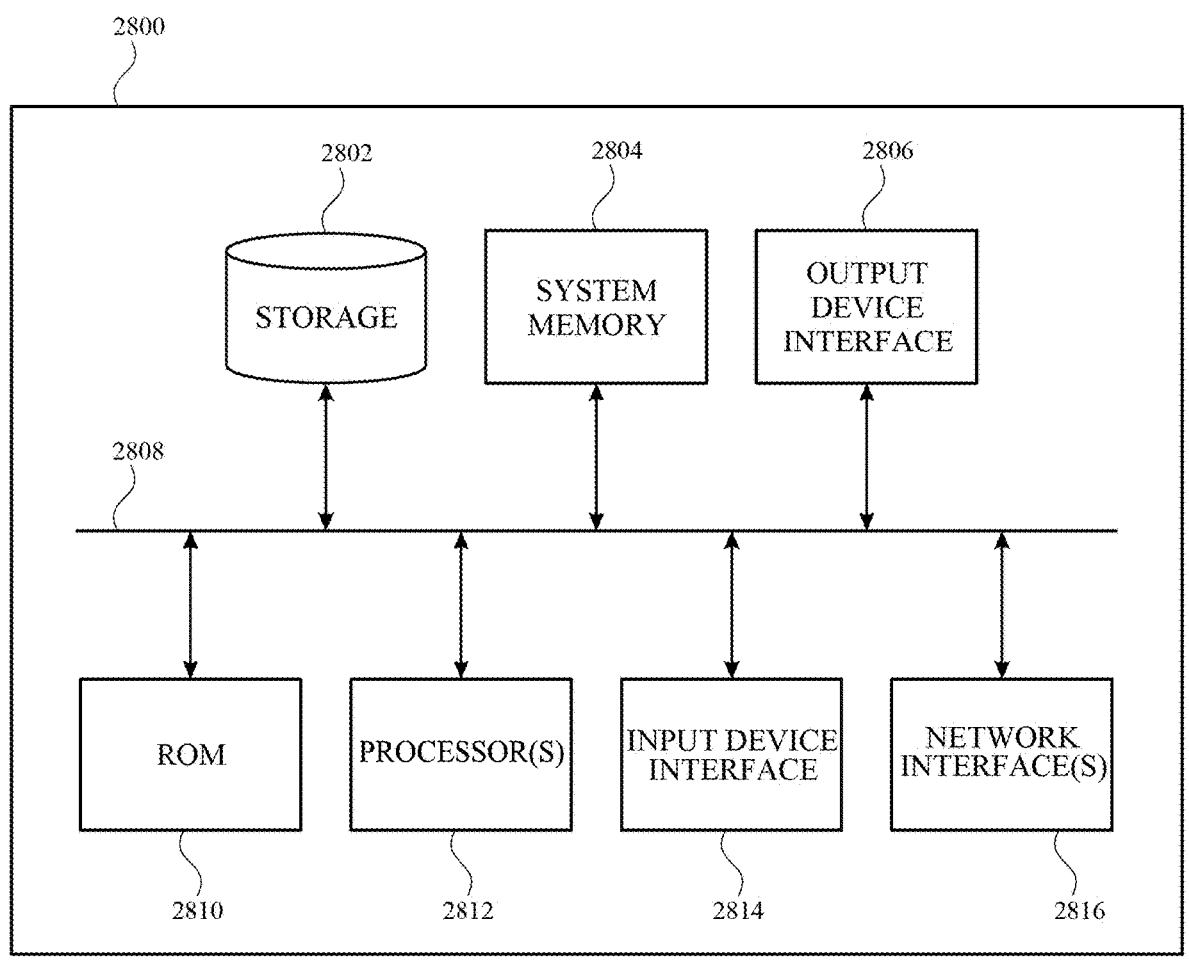
FIG. 28 illustrates an electronic system with which one or more implementations of the subject technology may be implemented.

FIG. 28 illustrates an electronic system 2800 with which one or more implementations of the subject technology may be implemented. The electronic system 2800 can be, and/or can be a part of, the electronic device 110, and/or the server 120 shown in FIG. 1. The electronic system 2800 may include various types of computer readable media and interfaces for various other types of computer readable media. The electronic system 2800 includes a bus 2808, one or more processing unit(s) 2812, a system memory 2804 (and/or buffer), a ROM 2810, a permanent storage device 2802, an input device interface 2814, an output device interface 2806, and one or more network interfaces 2816, or subsets and variations thereof.

The bus 2808 collectively represents all system, peripheral, and chipset buses that communicatively connect the numerous internal devices of the electronic system 2800. In one or more implementations, the bus 2808 communicatively connects the one or more processing unit(s) 2812 with the ROM 2810, the system memory 2804, and the permanent storage device 2802. From these various memory units, the one or more processing unit(s) 2812 retrieves instructions to execute and data to process in order to execute the processes of the subject disclosure. The one or more processing unit(s) 2812 can be a single processor or a multi-core processor in different implementations.

The ROM 2810 stores static data and instructions that are needed by the one or more processing unit(s) 2812 and other modules of the electronic system 2800. The permanent storage device 2802, on the other hand, may be a read-and-write memory device. The permanent storage device 2802 may be a non-volatile memory unit that stores instructions and data even when the electronic system 2800 is off. In one or more implementations, a mass-storage device (such as a magnetic or optical disk and its corresponding disk drive) may be used as the permanent storage device 2802.

In one or more implementations, a removable storage device (such as a floppy disk, flash drive, and its corresponding disk drive) may be used as the permanent storage device 2802. Like the permanent storage device 2802, the system memory 2804 may be a read-and-write memory device. However, unlike the permanent storage device 2802, the system memory 2804 may be a volatile read-and-write memory, such as random access memory. The system memory 2804 may store any of the instructions and data that one or more processing unit(s) 2812 may need at runtime. In one or more implementations, the processes of the subject disclosure are stored in the system memory 2804, the permanent storage device 2802, and/or the ROM 2810. From these various memory units, the one or more processing unit(s) 2812 retrieves instructions to execute and data to process in order to execute the processes of one or more implementations.

The bus 2808 also connects to the input and output device interfaces 2814 and 2806. The input device interface 2814 enables a user to communicate information and select commands to the electronic system 2800. Input devices that may be used with the input device interface 2814 may include, for example, alphanumeric keyboards and pointing devices (also called "cursor control devices"). The output device interface 2806 may enable, for example, the display of images generated by electronic system 2800. Output devices that may be used with the output device interface 2806 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 28, the bus 2808 also couples the electronic system 2800 to one or more networks and/or to one or more network nodes, such as the electronic device 110 shown in FIG. 1, through the one or more network interface(s) 2816. In this manner, the electronic system 2800 can be a part of a network of computers (such as a LAN, a wide area network ("WAN"), or an Intranet, or a network of networks, such as the Internet. Any or all components of the electronic system 2800 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of preceding a series of items, with the term "and" or "or" to separate any of the items, modifies the list as a whole, rather than each member of the list (i.e., each item). The phrase "at least one of does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving a command to initiate an application;
   in response to the command, generating a root node of a tree structure corresponding to a first hierarchy of views representing a user interface (UI) for the application, the root node representing a root view of the first hierarchy of views;
   generating a child node of the root node for including in the tree structure corresponding to the first hierarchy of views, the child node representing a first type of view of the first hierarchy of views;
   generating a first child node of the child node for including in the tree structure corresponding to the first hierarchy of views, the first child node representing a second type of view of the first hierarchy of views; and
   generating a graph including nodes, each node corresponding to a different attribute of the UI, wherein the root node, the child node, and the first child node of the tree structure corresponding to the first hierarchy of views have relationships with respective nodes from the graph, and the graph is separate from the first hierarchy of views which is separate from the tree structure, wherein each node of the tree structure corresponding to the first hierarchy of views is assigned a particular number of attributes from the respective nodes of the graph.

2. The method of claim 1, wherein the first type of view comprises a layout of a graphical element of the UI, and the second type of view comprises the graphical element of the UI, and the first type of view is a conditional view of the layout of the graphical element of the UI.

3. The method of claim 1, wherein the first type of view comprises at least one of an X-axis layout, a Y-axis layout, a Z-axis layout, and a radial layout.

4. The method of claim 1, wherein the first type of view comprises a property that is animated, and the property comprises at least one of a color, a numerical value, a vector, and a particular property where values are interpolated.

5. The method of claim 1, further comprising:
   receiving a second command to perform an update on the root node; and
   in response to the received second command, initiating respective updates on the child node and the first child node, wherein the respective updates are based at least in part on binding information associated with the child node or the first child node.

6. The method of claim 5, wherein the second command is received in response to at least one of an input, an event, data received over a network, a gesture, and a change in time.

7. The method of claim 5, wherein initiating respective updates on the child node and the first child node further comprises:
   generating a second root node of a second tree structure corresponding to a second hierarchy of views representing a second user interface (UI), the second root node representing a second root view of the second hierarchy of views;
   generating a second child node of the second root node for including in the second tree structure corresponding to the second hierarchy of views, the second child node representing a second type of view and corresponding to an updated child node;

generating a respective child node of the second child node for including in the tree structure corresponding to the second hierarchy of views, the respective child node representing a respective type of view of the second hierarchy of views;

updating the graph including respective nodes corresponding to different attributes of each node from the second hierarchy of views; and discarding the first hierarchy of views and the tree structure including the root node, the child node, and the first child node.

8. A system comprising:
a processor;
a memory device containing instructions, which when executed by the processor cause the processor to provide:

in response to receipt of a command to initiate an application, generating a root node of a tree structure corresponding to a first hierarchy of views representing a user interface (UI), the root node representing a root view of the first hierarchy of views;

generate a child node of the root node for including in the tree structure corresponding to the first hierarchy of views, the child node representing a first type of view;

generate a first child node of the child node for including in the tree structure corresponding to the first hierarchy of views, the first child node representing a second type of view; and generate a graph including nodes, each node corresponding to a different attribute of the UI, wherein the root node, the child node, the first child node of the tree structure corresponding to the first hierarchy of views have relationships with respective nodes from the graph, and the graph being separate from the first hierarchy of views which is separate from the tree structure, wherein each node of the tree structure corresponding to the first hierarchy of views is assigned a particular number of attributes from the respective nodes of the graph.

9. The system of claim 8, wherein the first type of view comprises a layout of a graphical element of the UI, and the second type of view comprises the graphical element of the UI, and the first type of view is a conditional view of the layout of the graphical element of the UI.

10. The system of claim 8, wherein the first type of view comprises at least one of an X-axis layout, a Y-axis layout, a Z-axis layout, and a radial layout.

11. The system of claim 8, wherein the first type of view comprises a property that is animated, and the property comprises at least one of a color, a numerical value, a vector, and a particular property where values are interpolated.

12. The system of claim 8, wherein the memory device contains further instructions, which when executed by the processor, cause the processor to further:

receiving a second command to perform an update on the root node; and in response to the received second command, initiating respective updates on the child node and the first child node, wherein the respective updates are based at least in part on binding information associated with the child node or the first child node.

13. The system of claim 12, wherein the second command is received in response to at least one of an input, an event, data received over a network, a gesture, and a change in time.

14. The system of claim 12, wherein to initiate respective updates on the child node and the first child node further causes the processor to:

generate a second root node of a second tree structure corresponding to related to a second root view of a second hierarchy of views representing a second user interface (UI), the second root node representing a second root view of the second hierarchy of views;

generate a second child node of the second root node for including in the second tree structure corresponding to the second hierarchy of views, the second child node representing a second type of view and corresponding to an updated child node;

generate a respective child node of the second child node for including in the tree structure corresponding to the second hierarchy of views, the respective child node representing a respective type of view of the second hierarchy of views;

update the graph including respective nodes corresponding to different attributes of each node from the second hierarchy of views; and discard the first hierarchy of views and the tree structure including the root node, the child node, and the first child node.

15. A non-transitory computer-readable medium comprising instructions, which when executed by a computing device, cause the computing device to perform operations comprising:

generating a root node of a tree structure corresponding to a first hierarchy of views representing a user interface (UI) of an application;

generating a child node of the root node for including in the tree structure corresponding to the first hierarchy of views, the child node representing a first type of view;

generating a first child node of the child node for including in the tree structure corresponding to the first hierarchy of views, the first child node representing a second type of view; and generating a graph including nodes, each node corresponding to a different attribute of the UI, wherein the root node, the child node, the first child node of the tree structure corresponding to the first hierarchy of views have relationships with respective nodes from the graph, the graph is separate from the first hierarchy of views, and the first hierarchy of views is separate from the tree structure and the graph, wherein each node of the tree structure corresponding to the first hierarchy of views is assigned a particular number of attributes from the respective nodes of the graph.

16. The non-transitory computer-readable medium of claim 15, wherein the first type of view comprises a layout of a graphical element of the UI, and the second type of view comprises the graphical element of the UI, and the first type of view is a conditional view of the layout of the graphical element of the UI.

17. The non-transitory computer-readable medium of claim 15, wherein the first type of view comprises at least one of an X-axis layout, a Y-axis layout, a Z-axis layout, and a radial layout.

18. The non-transitory computer-readable medium of claim 15, wherein the first type of view comprises a property that is animated, and the property comprises at least one of a color, a numerical value, a vector, and a particular property where values are interpolated.

19. The non-transitory computer-readable medium of claim 15 comprising further instructions, which when executed by the computing device, cause the computing device to perform further operations comprising:
   receiving a command to perform an update on the root node; and
   in response to the received command, initiating respective updates on the child node and the first child node, wherein the respective updates are based at least in part on binding information associated with the child node or the first child node.

20. The non-transitory computer-readable medium of claim 19, wherein initiating respective updates on the child node and the first child node further causes the computing device to perform further operations comprising:
   generating a second root node of a second tree structure corresponding to a second hierarchy of views representing a second user interface (UI);
   generating a second child node of the second root node for including in the second tree structure corresponding to the second hierarchy of views, the second child node representing a second type of view and corresponding to an updated child node;
   generating a respective child node of the second child node for including in the tree structure corresponding to the second hierarchy of views, the respective child node representing a respective type of view of the second hierarchy of views;
   updating the graph including respective nodes corresponding to different attributes of each node from the second hierarchy of views; and
   discarding the first hierarchy of views and the tree structure including the root node, the child node, and the first child node.

\* \* \* \* \*